US012185043B2

(12) United States Patent
You et al.

(10) Patent No.: US 12,185,043 B2
(45) Date of Patent: Dec. 31, 2024

(54) DISPLAY APPARATUS

(71) Applicant: LG Display Co., Ltd., Seoul (KR)

(72) Inventors: YoungYoon You, Paju-si (KR); MinJin Lee, Paju-si (KR); Taehyung Kim, Paju-si (KR); GyungBo Ha, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 261 days.

(21) Appl. No.: 17/868,676

(22) Filed: Jul. 19, 2022

(65) Prior Publication Data

US 2022/0377445 A1 Nov. 24, 2022

Related U.S. Application Data

(63) Continuation of application No. 17/125,913, filed on Dec. 17, 2020, now Pat. No. 11,432,061, which is a continuation of application No. 16/426,405, filed on May 30, 2019, now Pat. No. 10,911,852.

(30) Foreign Application Priority Data

Dec. 31, 2018 (KR) ........................ 10-2018-0174213
Apr. 19, 2019 (KR) ........................ 10-2019-0046376

(51) Int. Cl.
*H04R 1/02* (2006.01)
*H04R 17/00* (2006.01)

(52) U.S. Cl.
CPC ............. *H04R 1/028* (2013.01); *H04R 17/00* (2013.01); *H04R 2499/15* (2013.01)

(58) Field of Classification Search
CPC ............................ H04R 17/00; H04R 2499/15
See application file for complete search history.

(56) References Cited

U.S. PATENT DOCUMENTS

2005/0025330 A1 2/2005 Saiki et al.
2009/0034759 A1 2/2009 Ko et al.
2012/0243719 A1 9/2012 Franklin et al.
2013/0051596 A1 2/2013 Park et al.
2015/0010187 A1 1/2015 Lee et al.
(Continued)

FOREIGN PATENT DOCUMENTS

CN 1581891 A 2/2005
CN 102956153 A 3/2013
(Continued)

OTHER PUBLICATIONS

DE Office Action dated Jan. 18, 2022, issued in counterpart German Patent Application No. 10 2019 117 468.6.
(Continued)

*Primary Examiner* — Sunita Joshi
(74) *Attorney, Agent, or Firm* — Morgan, Lewis & Bockius LLP

(57) ABSTRACT

A display apparatus includes a display module that includes a display panel and is configured to display an image. A rear cover is on a rear surface of the display module. A first vibration generating module is in a first rear region of the rear cover, and a second vibration generating module in a second rear region of the rear cover. The rear cover includes a first hole that overlaps the first vibration generating module, and a second hole that overlaps the second vibration generating module.

39 Claims, 13 Drawing Sheets

(56) References Cited

U.S. PATENT DOCUMENTS

| | | | |
|---|---|---|---|
| 2015/0185963 A1 | 7/2015 | Lee et al. | |
| 2015/0373441 A1 | 12/2015 | Behles et al. | |
| 2016/0050472 A1 | 2/2016 | Lee et al. | |
| 2017/0280234 A1 | 9/2017 | Choi et al. | |
| 2017/0289694 A1 | 10/2017 | Choi et al. | |
| 2018/0317000 A1 | 11/2018 | Ham et al. | |
| 2018/0317011 A1 | 11/2018 | Choi et al. | |
| 2018/0348816 A1 | 12/2018 | Lee et al. | |
| 2019/0037164 A1 | 1/2019 | Kim et al. | |

FOREIGN PATENT DOCUMENTS

| | | | |
|---|---|---|---|
| CN | 108124218 A | 6/2018 | |
| CN | 108806556 A | 11/2018 | |
| CN | 108810760 A | 11/2018 | |
| EP | 1345469 A1 | 9/2003 | |
| EP | 1507438 A2 | 2/2005 | |
| EP | 3 331 251 A1 | 6/2018 | |
| EP | 3 343 272 A1 | 7/2018 | |
| EP | 3442243 A1 * | 2/2019 | ........... G06F 1/1605 |
| EP | 3 499 337 A1 | 6/2019 | |
| EP | 3627278 A2 | 3/2020 | |
| JP | S63-168292 A | 7/1988 | |
| JP | 2003-158787 A | 5/2003 | |
| JP | 2003-271074 A | 9/2003 | |
| JP | 2003-339091 A | 11/2003 | |
| JP | 2005-110216 A | 4/2005 | |
| JP | 2007-189707 A | 7/2007 | |
| JP | 2008-048079 A | 2/2008 | |
| JP | 2009-100223 A | 5/2009 | |
| JP | 2016-032240 A | 3/2016 | |
| JP | 2016-149737 A | 8/2016 | |
| JP | 2017-187734 A | 10/2017 | |
| JP | 2017-195613 A | 10/2017 | |
| KR | 10-1919454 B1 | 11/2018 | |
| KR | 10-2018-0131228 A | 12/2018 | |
| WO | 2019/131041 A1 | 7/2019 | |

OTHER PUBLICATIONS

Hintergrundbeleuchtung (Wikipedia). Jul. 13, 2018. S. 1-6. (URL=https://de.wikipedia.org/w/index.php?title=Hintergrundbeleuchtung&oldid=179111441).

Lautsprecher (Wikipedia). Nov. 2, 2018. S. 1-29. (URL=https://de.wikipedia.org/w/index.php?title=Lautsprecher&oldid= 182387659).

Office Action dated Jan. 10, 2023, issued in corresponding Japanese Patent Application No. 2021-203980.

Office Action dated Jan. 1, 2024 for Korean Patent Application No. 10-2019-0046376.

Office Action dated Jun. 8, 2022, issued in corresponding German Patent Application No. 102019117468.6, 9 pages.

Office Action dated Mar. 28, 2023, issued in Japanese Patent Application No. 2022-032099.

Office Action dated Mar. 17, 2023, issued in GB Patent Application No. 2300633.1.

Office Action dated Oct. 28, 2020, issued in corresponding Japanese Patent Application No. 2019-166257.

Office Action dated Jun. 3, 2021, issued in corresponding Chinese Patent Application No. 201910461982.7.

Office Action issued in corresponding Japanese Patent Application No. 2023-129089 dated Sep. 18, 2024.

Office Action issued in corresponding Chinese Patent Application No. 202210702606.4, dated Sep. 30, 2024.

1 Office Action issued in corresponding Chinese Patent Application No. 202210704568.6, dated Jun. 5, 2024.

* cited by examiner

DISPLAY APPARATUS

CROSS-REFERENCE TO RELATED APPLICATIONS

This application is a continuation of U.S. patent application Ser. No. 17/125,913, filed Dec. 17, 2020, which is a continuation of U.S. patent application Ser. No. 16/426,405, filed May 30, 2019, now U.S. Pat. No. 10,911,852, which claims the benefit of and priority to Korean Patent Application No. 10-2018-0174213, filed on Dec. 31, 2018, and Korean Patent Application No. 10-2019-0046376, filed on Apr. 19, 2019, each of which is hereby incorporated by reference in its entirety as if fully set forth herein.

BACKGROUND

Technical Field

The present disclosure relates to a display apparatus, and more particularly, to a display apparatus including a display panel for outputting sound.

Discussion of the Related Art

Generally, display apparatuses are equipped in home appliances or electronic devices, such as televisions (TVs), monitors, notebook computers, smartphones, tablet computers, electronic organizers, electronic pads, wearable devices, watch phones, portable information devices, navigation devices, and automotive control display apparatuses, and are used as a screen for displaying an image.

Display apparatuses may include a display panel for displaying an image and a sound device for outputting a sound associated with the image.

However, in general display apparatuses, because a sound output from a sound device may travel to a rearward or a downward direction of the display apparatus, sound quality may be degraded due to interference between sounds reflected from a wall and the ground. For this reason, it may be difficult to transfer an accurate sound, and an immersion experience of a viewer is reduced.

SUMMARY

Accordingly, the present disclosure directed to a display apparatus that substantially obviates one or more problems due to limitations and disadvantages of the related art.

An aspect of the present disclosure is to provide a display apparatus for transferring an accurate sound.

Another aspect of the present disclosure is to provide a display apparatus for providing improved sound quality and for increasing an immersion experience of a viewer.

Another aspect of the present disclosure is to provide a display apparatus that generates sound for traveling to a forward region in front of a display panel.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and claims hereof as well as the appended drawings.

To achieve these and other aspects of the inventive concepts, as embodied and broadly described, a display apparatus comprises a display module including a display panel and configured to display an image; a rear cover on a rear surface of the display module; a first vibration generating module in a first rear region of the rear cover; and a second vibration generating module in a second rear region of the rear cover, wherein the rear cover includes: a first hole that overlaps the first vibration generating module, and a second hole that overlaps the second vibration generating module.

In another aspect, a display apparatus comprises a display module including a display panel and configured to display an image; a rear cover including a rear cover part that covers a rear surface of the display module; and a first vibration generating module and a second vibration generating module both in the rear cover part and configured to vibrate the display module; wherein the rear cover part includes: a first gap between the first vibration generating module and the display module; and a second gap between the second vibration generating module and the display module.

According to an embodiment of the present disclosure, a display apparatus for transferring an accurate sound may be provided, and a display apparatus for providing improved sound quality and increasing an immersion experience of a viewer may be provided.

According to an embodiment of the present disclosure, a display apparatus for outputting sound to a forward region in front of a display panel may be provided.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain principles of the disclosure. In the drawings.

DETAILED DESCRIPTION

Figure 1:
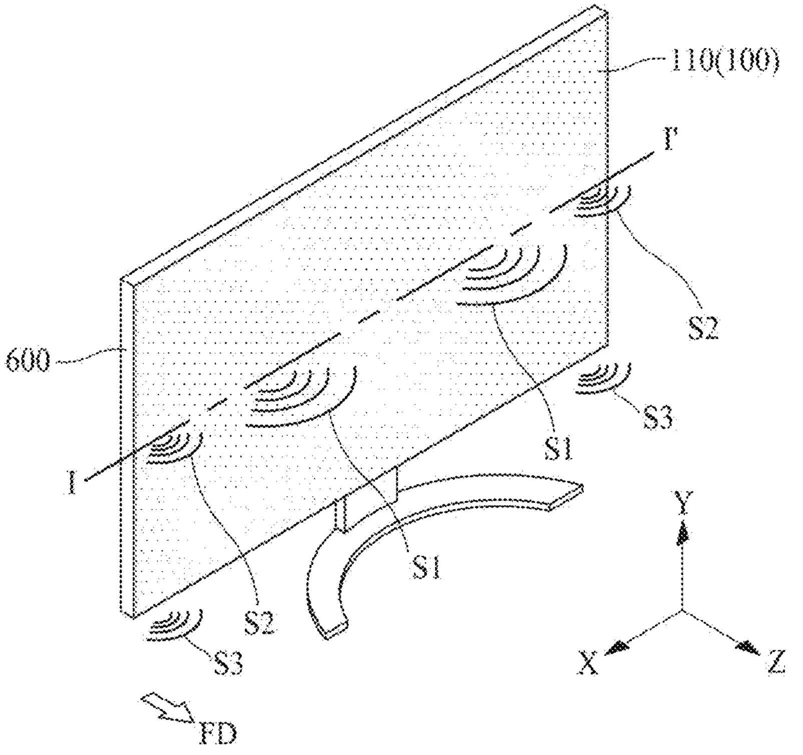
FIG. 1 illustrates a display apparatus according to an embodiment of the present disclosure.

Reference will now be made in detail to embodiments of the present disclosure, examples of which are illustrated in the accompanying drawings. Wherever possible, the same reference numbers may be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known technology is determined to unnecessarily obscure the important point of the present disclosure, the detailed description will be omitted.

When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range. In describing a position relationship, for example, when a position relation between two parts is described as, for example, "on," "over," "under," and "next," one or more other parts may be disposed between the two parts unless a more limiting term, such as "just" or "direct(ly)" is used. In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of a display apparatus according to the present disclosure will be described in detail with reference to the accompanying drawings. In adding reference numerals to elements of each of the drawings, although the same elements are illustrated in other drawings, like reference numerals may refer to like elements. In the following description, when the detailed description of the relevant known function or configuration is determined to unnecessarily obscure the present disclosure, the detailed description may be omitted. Also, for convenience of description, a scale of each of elements illustrated in the accompanying drawings differs from a real scale, and thus, is not limited to a scale illustrated in the drawings.

The inventors have recognized problems of general display apparatuses and have performed various experiments so that, when a user in front of a display panel is watching an image, a traveling direction of sound is toward a front surface of the display panel. Thus, sound quality may be enhanced. Thus, through the various experiments, the inventors have invented a display apparatus that may generate sound traveling to a forward region in front of the display panel, thereby enhancing sound quality.

FIG. 1 illustrates a display apparatus according to an embodiment of the present disclosure.

With reference to FIG. 1, the display apparatus according to an embodiment of the present disclosure may output sounds S1, S2, and S3, based on a vibration of a display module 100 configured to display an image. F or example, in the display apparatus, the display module 100 may vibrate by a vibration generating device (or a sound generating device) to generate the sounds S1, S2, and S3. The sounds S1 and S2 of the sounds S1, S2, and S3 generated based on the vibration of the display module 100 may be directly output to a screen forward region FD in front of the display apparatus, and the other sound S3 may be output to a side surface of the display apparatus and may travel to the screen forward region FD. Therefore, by using the display module 100 as a vibration plate for generating a sound, the display apparatus according to an embodiment of the present disclosure may output the sounds S1 and S2 to the screen forward region FD in front of the display apparatus, thereby enabling the transfer of an accurate sound, improving sound quality, and increasing an immersion experience of a viewer.

Figure 2:
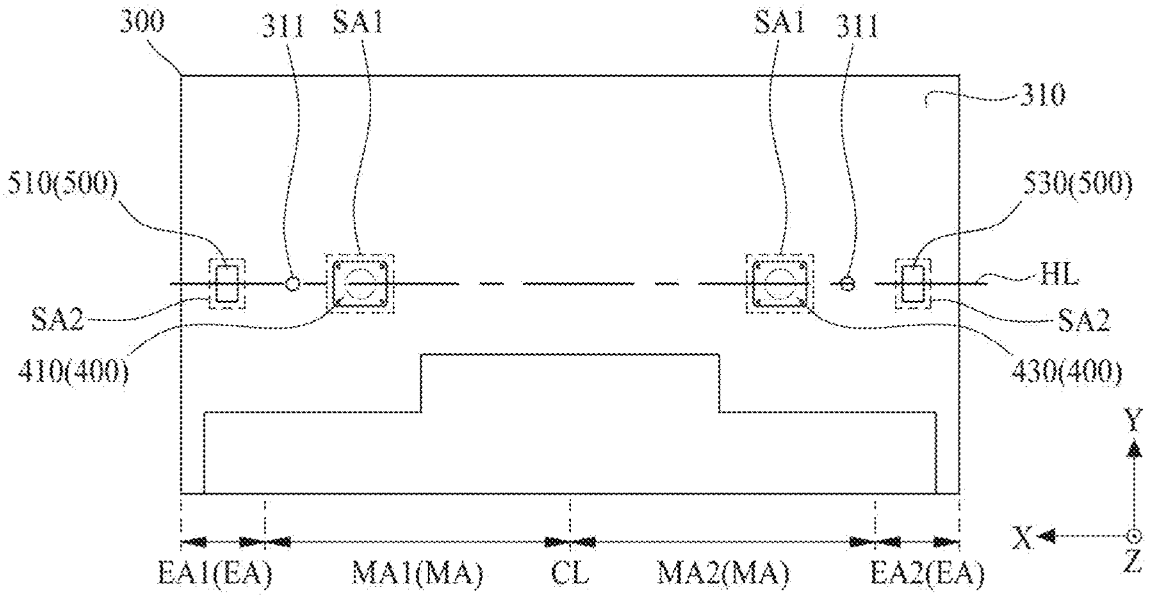
FIG. 2 illustrates a vibration generating module in a rear cover of the display apparatus illustrated in FIG. 1.
Figure 3:
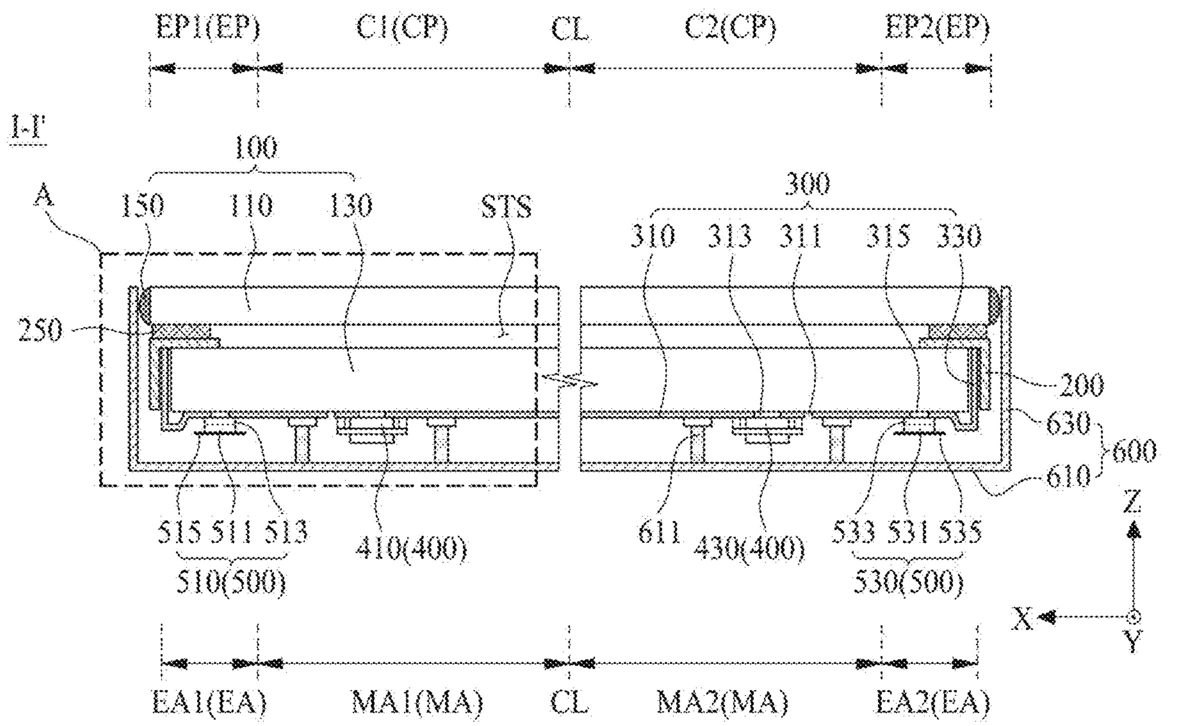
FIG. 3 is a cross-sectional view taken along line I-I' illustrated in FIG. 1.
Figure 4:
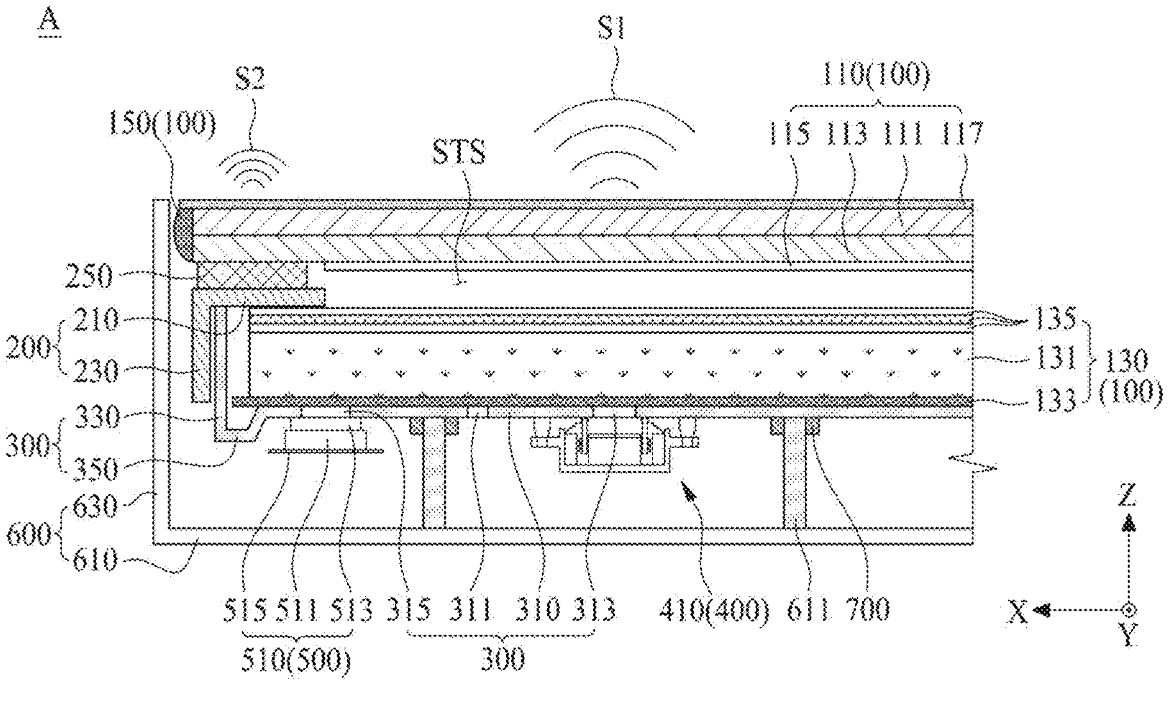
FIG. 4 is an enlarged view of a portion 'A' illustrated in FIG. 3.

FIG. 2 illustrates a vibration generating module in a rear cover of the display apparatus illustrated in FIG. 1. FIG. 3 is a cross-sectional view taken along line I-I' illustrated in FIG. 1. FIG. 4 is an enlarged view of a portion 'A' illustrated in FIG. 3.

With reference to FIGS. 2 to 4, the display apparatus according to an embodiment of the present disclosure may include the display module 100, a panel guide 200, a rear cover 300, a first vibration generating module 400, and a second vibration generating module 500. The display module 100 may be a liquid crystal display module, but is not limited thereto. For example, the display module 100 may be a display module such as a light-emitting display module, an electrophoretic display module, a micro light-emitting diode display module, an electrowetting display module, or a quantum dot light-emitting display module.

A rear surface (or a back surface) of the display module 100 may include a center portion CP and periphery portions EP. In an example, the rear surface (or the back surface) of the display module 100 may be divided into the center portion CP and the periphery portions EP, which are parallel to each other with the center portion CP therebetween.

The center portion CP of the display module 100 may be divided into a first center portion C1 and a second center portion C2. For example, the first center portion C1 may be a left portion (or a left center portion) of the center portion CP, and the second center portion C2 may be a right portion (or a right center portion) of the center portion CP. With respect to a first direction X (or a widthwise direction) of the display module 100, the first center portion C1 and the second center portion C2 may be horizontally symmetrical about a center line CL of the display module 100.

The display module 100 according to an embodiment of the present disclosure may include a display panel 110 and a backlight unit 130.

The display panel 110 may be configured to display an image using light irradiated from the backlight unit 130. Also, the display panel 110 may act as a vibration plate, which vibrates based on vibrations of the first and second vibration generating modules 400 and 500 to output sound to a forward region FD in front of the display panel 110. For example, the display panel 110 may simultaneously or sequentially output a first sound S1 of a first sound band based on the vibration of the first vibration generating module 400 and a second sound S2 of a second sound band based on the vibration of the second vibration generating module 500 to the forward region FD. The first sound band may differ from the second sound band. Here, the first sound S1 of the first sound band may be output from a center portion CP of the display panel 110 to the forward region FD, and the second sound S2 of the second sound band higher than the first sound S1 of the first sound band may be output from the periphery portion EP of the display panel 110 to the forward region FD.

The display panel 110 may include an upper substrate 111, a lower substrate 113, a lower polarization member 115, and an upper polarization member 117.

The upper substrate 111, which may be a thin film transistor (TFT) array substrate, may include a pixel array (or display portion) including a plurality of pixels respectively in a plurality of pixel areas by intersections of a plurality of gate lines and a plurality of data lines. Each of the plurality of pixels may include a TFT connected to a gate line and a data line corresponding thereto, a pixel electrode connected to the TFT, and a common electrode, which is provided adjacent to the pixel electrode, and is supplied with a common voltage. The upper substrate 111 may further include a pad part in a first periphery (or a first non-display portion) thereof, and a gate driving circuit in a second periphery (or a second non-display portion) thereof.

The pad part may provide the pixel array and the gate driving circuit with a signal supplied from the outside. For example, the pad part may include a plurality of data pads connected to the plurality of data lines through a plurality of data link lines and a plurality of gate input pads connected to the gate driving circuit via a gate control signal line. A first periphery of the upper substrate 111 including the pad part may protrude from a corresponding side surface of the first periphery of the lower substrate 113, and the pad part may be exposed in a rearward direction toward the rear cover 300. For example, the upper substrate 111 may have a size that is greater than that of the lower substrate 113, but is not limited thereto.

The gate driving circuit may be embedded (or integrated) into the second periphery of the upper substrate 111 to be connected to the plurality of gate lines in a one-to-one relationship. For example, the gate driving circuit may be a shift register including a transistor that may be formed through the same process as a process of forming a TFT in each of the pixel areas. As another example, the gate driving circuit may be in the panel driving circuit without being embedded into the upper substrate 111.

The lower substrate 113, which may be a color filter array substrate, may include a pixel defining pattern that defines an opening area overlapping each of the pixel areas on the upper substrate 111, and a color filter layer in the opening area. The lower substrate 113 may have a size that is less than that of the upper substrate 111. For example, the lower substrate 113 may overlap a portion other than the first periphery of the upper substrate 111. The lower substrate 113 may be attached to the upper substrate 111 with a liquid crystal layer therebetween using a sealant.

The liquid crystal layer may be between the upper substrate 111 and the lower substrate 113, and may include a liquid crystal including liquid crystal molecules having an alignment direction that is changed based on an electric field generated by the common voltage and a data voltage applied to the pixel electrode in each of the plurality of pixels. The lower polarization member 115 may be on a lower surface of the lower substrate 113, and may polarize light that is irradiated from the backlight unit 130 and travels to the liquid crystal layer. The upper polarization member 117 may be on an upper surface of the upper substrate 111, and may polarize light that passes through the upper substrate 111 and is output to the outside.

The display panel 110 according to an embodiment may drive the liquid crystal layer according to the electric field generated by the common voltage and the data voltage applied to the pixel electrode in each of the plurality of pixels, thereby displaying an image by using light passing through the liquid crystal layer. Because the upper substrate 111—which is the TFT array substrate—configures an image display surface, a whole front surface of the display panel 110 according to an embodiment may be externally exposed without being covered by a separate mechanism.

However, embodiments are not limited thereto, for example, according to another embodiment, in the display panel 110, the upper substrate 111 may be the color filter array substrate, and the lower substrate 113 may be the TFT array substrate. For example, the display panel 110 according to another embodiment may be a type in which an upper portion and a lower portion of the display panel 110 are reversed therebetween. As another example, a pad part of the display panel 110 according to another embodiment may be covered by a separate mechanism or structure.

The display module 100 according to an embodiment may further include a buffering member 150. The buffering member 150 may surround side surfaces of the display panel 110, and may cover each side surface and each corner of the display panel 110. The buffering member 150 may protect the side surfaces of the display panel 110 from an external impact, and/or may reduce or prevent light from leaking through the side surfaces of the display panel 110. The buffering member 150 may include a silicon-based sealant or ultraviolet (UV)-curable sealant (or resin). In one embodiment, considering a process tact time, the buffering member 150 may include the UV-curable sealant. Also, the buffering member 150 may have color (for example, blue, red, bluish green, or black), but is not limited thereto. For example, the buffering member 150 may include a colored resin or a light-blocking resin for preventing leakage of light through a side surface.

A portion of an upper surface of the buffering member 150 according to an embodiment may be covered by the upper polarization member 117. For example, the upper polarization member 117 may include an extension portion that extends lengthwise from a side surface corresponding to an outer surface of the upper substrate 111 to cover a portion of a front surface of the buffering member 150, and is attached on a portion of the front surface of the buffering member 150. A bonding or attaching surface (or a boundary portion between the buffering member 150 and the upper substrate 111) between the buffering member 150 and the upper substrate 111 may be concealed by the extension portion of the upper polarization member 117, and may not be exposed at a forward region, at which a viewer is located, in front of the display apparatus. In an example in which the buffering member 150 is not provided, the side surfaces of the display panel 110 may be exposed at the forward region FD in front of the display apparatus without a separate mechanism, and leakage of light through the side surfaces of the display panel 110 may occur. Accordingly, to reduce and possibly minimize or remove a bezel width of the display apparatus, in the display apparatus having a structure in which the whole front surface of the display panel 110 is exposed at the forward region FD, the buffering member 150 may be provided for reducing or preventing light from being leaked through the side surface of the display panel 110, and for protecting the side surface of the display panel 110.

The backlight unit 130 may be on a rear surface of the display panel 110 and may irradiate light onto the rear surface of the display panel 110. According to an embodiment, the backlight unit 130 may include a light guide plate 131, a light source unit, a reflective sheet 133, and an optical sheet part 135.

The light guide plate 131 may include a light incident surface that is disposed on the rear cover 300 to overlap the display panel 110 and is provided on at least one sidewall thereof. The light guide plate 131 may include a light-transmitting plastic or glass material. Furthermore, the light guide plate 131 may transfer (or output) light, which is incident through the light incident surface from the light source unit, to the display panel 110. In an example, the light guide plate 131 may be referred to as a "light guide member" or a "plane light source," but is not limited thereto.

The light source unit may irradiate light onto the light incident surface in the light guide plate 131. The light source unit may be disposed in the rear cover 300 to overlap a first periphery of the display panel 110. The light source unit according to an embodiment may include a plurality of light-emitting diodes (LEDs), which are mounted on a light source printed circuit board (PCB) and irradiate light onto the light incident surface of the light guide plate 131.

The reflective sheet 133 may cover a rear surface 300 of the light guide plate 131. The reflective sheet 133 may reflect light, which is incident from the light guide plate 131, toward the light guide plate 131 to reduce and possibly minimize the loss of the light.

The optical sheet unit 135 may be disposed on a front surface of the light guide plate 131, and may enhance a luminance characteristic of light output from the light guide plate 131. The optical sheet unit 135 according to an embodiment may include a lower diffusive sheet, a lower prism sheet, and an upper prism sheet, but is not limited thereto. In other embodiments, the optical sheet unit 135 may be configured by a stacked combination of one or more sheets among a diffusive sheet, a prism sheet, a dual brightness enhancement film (DBEF), and a lenticular sheet, or may be configured with one composite sheet having a light diffusing function and a light collecting function.

The panel guide 200 may support a periphery portion EP of the rear surface of the display panel 110. The panel guide 200 may be supported by or accommodated into the rear cover 300 to overlap the rear periphery portion EP of the display panel 110. Furthermore, the panel guide 200 may be disposed under the rear periphery portion EP of the display panel 110 so as not to protrude to the outside of each side surface of the display panel 110.

The panel guide 200 may include a panel supporting part 210 and a guide sidewall 230. In an example, the panel guide 200 may have a cross-sectional structure having a ㄱ-shape or a ┌-shape, based on a coupling or connection structure of the panel supporting part 210 and the guide sidewall 230.

The panel supporting part 210 may be coupled or connected to the rear periphery portion EP of the display panel 110, and may be supported by the rear cover 300. For example, the panel supporting part 210 may have a tetragonal band shape including a hole overlapping the center portion CP, other than the rear periphery portion EP, of the display panel 110, but is not limited thereto. The panel supporting part 210 may have a size equal to or less than that of the display panel 110 so as not to protrude to the outside of each side surface of the display panel 110. In an example, the hole of the panel supporting part 210 may have a size that is equal to or greater than that of a pixel array (or a display portion) in the display panel 110.

The panel supporting part 210 may directly contact an uppermost surface of the backlight unit 130 (for example, an uppermost surface of the optical sheet part 135), or may be spaced apart from the uppermost surface of the optical sheet part 135 by a certain distance.

The guide sidewall 230 may be connected to and/or integral with the panel supporting part 210, and may surround side surfaces of the rear cover 300. For example, the guide sidewall 230 may be bent from the panel supporting part 210 to the side surfaces of the rear cover 300, and may surround the side surfaces of the rear cover 300, or may be surrounded by the side surfaces of the rear cover 300.

The panel guide 200 may include a plastic material, a metal material, or a mixed material of a plastic material and a metal material. In an example, the panel guide 200 may act as a vibration transfer member that transfers a sound vibration, generated by the second vibration generating module 500, to the periphery portion EP of the display panel 110. Therefore, the panel guide 200 may transfer the sound vibration, generated by the second vibration generating module 500, to the display panel 110 without being lost in a state of maintaining stiffness of the display panel 110. In an example, the panel guide 200 may include a metal material for transferring the sound vibration, generated by the second vibration generating module 500, to the display panel 110 without being lost in a state of maintaining stiffness of the display panel 110, but is not limited thereto.

The panel guide 200 may be coupled to the periphery portion EP of the rear surface of the display panel 110 by a first coupling or connection member 250. The first connection member (or a panel connection member) 250 may be between the periphery portion EP of the rear surface of the display panel 110 and the panel supporting part 210 of the panel guide 200, and may attach the display panel 110 on the panel guide 200. The first connection member 250 may include an acryl-based adhesive member or a urethane-based adhesive member, but is not limited thereto. In an example, the first connection member 250 may include the urethane-based adhesive member, which may be relatively better in adhesive force and hardness than the acryl-based adhesive member, so that a vibration of the panel guide 200 is well transferred to the display panel 110. However, embodiments are not limited thereto. For example, the first connection member 250 may include an acryl-based adhesive layer, a double-sided foam adhesive pad, or an acryl-based adhesive resin curing layer.

A front surface of the first connection member 250 according to an embodiment may be coupled or connected to the lower substrate 113 or the lower polarization member 115 of the display panel 110. For example, the first connection member 250 may be directly coupled or connected to a periphery portion EP of the rear surface of the lower substrate 113 to enhance an adhesive force between the first connection member 250 and the display panel 110. The first connection member 250 may be attached on a periphery portion EP of the rear surface of the lower substrate 113, and may surround a side surface of the lower polarization member 115, thereby preventing light leakage of the side surface from occurring in the lower polarization member 115.

The first connection member 250 may provide a sound transfer space STS between the display panel 110 and the panel guide 200 to have a certain thickness (or height). The first connection member 250 according to an embodiment may have a four-side-closed shape or a closed loop shape on the panel supporting part 210 of the panel guide 200. For example, the first connection member 250 may provide the closed sound transfer space STS between a rearmost surface of the display panel 110 and an uppermost surface of the backlight unit 130, which face each other with the hole of the panel guide 200 therebetween, thereby preventing, reducing, or minimizing the leakage (or loss) of a sound pressure transferred to the sound transfer space STS. The sound transfer space STS may also act as a sound generating space in which a sound pressure is generated based on a vibration of the backlight unit 130, or a panel vibration space, which enables a vibration of the display panel 110 to be smoothly performed.

The rear cover 300 may be configured to support the panel guide 200, and may cover a rear surface of the display module 100. Also, the rear cover 300 may be configured to support the first and second vibration generating modules 400 and 500. The rear cover 300 may also act as a vibration plate, and thus, may include a metal material or a metal alloy material. For example, the rear cover 300 may include one of an Al material, a Mg alloy material, a Mg—Li alloy material, and an Al alloy material, but is not limited thereto.

The rear cover 300 may further include a rear cover part 310, which is configured to support the rear surface of the display module 100, and a side cover part 330, which is connected to and/or integral with a periphery portion EP of the rear cover part 310 to support the panel guide 200. The rear cover part 310 may cover the rear surface of the display module 100, and may support the display module 100. The rear cover part 310 may have a plate structure, support the backlight unit 130 of the display module 100, and support each of the first and second vibration generating modules 400 and 500. For example, the rear cover part 310 may directly contact a rear surface of the reflective sheet 133, and may transfer a sound vibration, generated based on a vibration of each of the first and second vibration generating modules 400 and 500, to the reflective sheet 133 of the backlight unit 130.

The rear cover part 310 may include a middle region MA corresponding to (or overlapping) the center portion CP of the display module 100 and a periphery region EA corresponding to (or overlapping) the periphery portion EP of the display module 100. The middle region MA (or a first cover region) of the rear cover part 310 according to an embodiment of the present disclosure may include a first middle region MA1 (or a left middle region) corresponding to (or overlapping) a first center portion C1 of the display module 100 and a second middle region MA2 (or a right middle region) corresponding to (or overlapping) a second center portion C2 of the display module 100, with respect to the center line CL of the display module 100. Each of the first middle region MA1 and the second middle region MA2 of the rear cover part 310 may include a first supporting region SA1 for supporting the first vibration generating module 400. In an example, a center portion of the first supporting region SA1 may be disposed on a horizontal line HL (or a center horizontal line) of the display module 100 with respect to a second direction Y (or a lengthwise direction), or may be disposed under or above the horizontal line HL along the second direction Y.

A periphery region EA (or a second cover region) of the rear cover part 310 may include a second supporting region SA2 for supporting the second vibration generating module 500. In an example, a center portion of the second supporting region SA2 may be disposed on the horizontal line HL (or the center horizontal line) of the display module 100 with respect to the second direction Y. A center portion of the first supporting region SA1 may be disposed on the horizontal line HL of the display module 100 identically to the center portion of the second supporting region SA2, or may be upwardly- or downwardly-spaced apart from the horizontal line HL along the second direction Y.

In FIG. 4, the rear cover part 310 is illustrated as being adhered to the backlight unit 130, but is not limited thereto. For example, the rear cover part 310 may be spaced apart from the backlight unit 130 by a distance corresponding to a certain space, and an air layer may be provided in a separation space therebetween. According to an embodiment, the separation space between the rear cover part 310 and the backlight unit 130 may be in the center portion CP of the display panel 110.

The rear cover part 310 according to an embodiment may include a rear cover hole 311 (or a first rear cover hole). The rear cover hole 311 may be spaced apart from one portion of the first vibration generating module 400, and may be in a middle region MA of the rear cover part 310 corresponding to the center portion CP of the display module 100. The rear cover hole 311 may be provided to pass through the rear cover part 310 in a thickness direction Z of the rear cover part 310 in the middle region MA of the rear cover part 310. For example, the rear cover hole 311 may be between the first supporting region SA1 and the second supporting region SA2 among regions of the rear cover part 310. The rear cover hole 311 may have a circular shape, but is not limited thereto. The rear cover hole 311 may be referred to as an "opening hole," a "hole portion," a "duct hole," or a "resonance hole," but is not limited thereto.

The rear cover hole 311, the rear cover part 310, the first vibration generating module 400, and the system rear cover 600 may configure a Helmholtz resonator, which may reduce a sound noise characteristic of a low-pitched sound. The Helmholtz resonator configured by the rear cover hole 311, the rear cover part 310, the first vibration generating module 400, and the system rear cover 600 will be described below with reference to FIGS. 9 and 10.

The rear cover 300 of the present disclosure may further include a first hole 313 and a second hole 315. The first hole 313 (or a first through hole or a second rear cover hole) may be disposed in a first rear region of the rear cover 300 overlapping the first vibration generating module 400, and may be covered by the reflective sheet 133 of the backlight unit 130. For example, the first hole 313 may be in the middle region MA of the rear cover part 310. The first hole 313 may be provided to pass through the first supporting region SA1 of the rear cover part 310 in the middle region MA of the rear cover part 310 in the thickness direction Z of the rear cover part 310.

The first hole 313 may provide a first gap that is between the backlight unit 130 and the first vibration generating module 400. For example, the first gap may be described as a vibration space based on driving of the first vibration generating module 400, a sound pressure space (or a sound portion or a resonance portion) in which a sound pressure is generated based on a vibration of the first vibration generating module 400, or a sound wave propagation path (or a sound energy input portion) through which a sound wave generated based on the vibration of the first vibration generating module 400 is directly propagated to the display module 100, but is not limited thereto.

A size (or a width) of the first hole 313 according to an embodiment may be less than that of the first vibration generating module 400. When the total size (or the total width) of the first hole 313 is greater than that of the first vibration generating module 400, the first vibration generating module 400 may be inserted into (or pass through or accommodated into) the first hole 313, and thus, if a separate mechanism is not used, the first vibration generating module 400 may not be disposed in the rear cover part 310. Therefore, when the total size of the first hole 313 is less than that of the first vibration generating module 400, the first vibration generating module 400 may be disposed in the rear cover part 310 to overlap the first hole 313 even without a separate mechanism. In an example, the first hole 313 according to an embodiment may have the same shape as that of the first vibration generating module 400, or may have a tetragonal (e.g., quadrilateral) shape or a circular shape, but is not limited thereto.

The second hole 315 (or a second through hole or a third rear cover hole) may be disposed in a second rear region of the rear cover 300 overlapping the second vibration generating module 500, and may be covered by the reflective sheet 133 of the backlight unit 130. For example, the second hole 315 may be provided in a periphery region EA of the rear cover part 310. The second hole 315 may be provided to pass through a second supporting region SA2 of the rear cover part 310 disposed in the periphery region EA of the rear cover part 310 in a thickness direction Z of the rear cover part 310.

The second hole 315 may provide a second gap that is between the backlight unit 130 and the second vibration generating module 500. In an example, the second gap may be described as a vibration space based on driving of the second vibration generating module 500, a sound pressure space (or a sound portion or a resonance portion) in which a sound pressure is generated based on a vibration of the second vibration generating module 500, or a sound wave propagation path (or a sound energy input portion) through which a sound wave generated based on the vibration of the second vibration generating module 500 is directly propagated to the display module 100, but is not limited thereto.

A size (or a width) of the second hole 315 according to an embodiment may be less than that of the second vibration generating module 500. When the total size (or the total width) of the second hole 315 is greater than that of the second vibration generating module 500, the second vibration generating module 500 may be inserted into (or pass through or be accommodated into) the second hole 315, and thus, if a separate mechanism is not used, the second vibration generating module 500 may not be disposed in the rear cover part 310 to overlap the second hole 315. Therefore, when the total size of the second hole 315 is less than that of the second vibration generating module 500, the second vibration generating module 500 may be disposed in the rear cover part 310 to overlap the second hole 315 even without a separate mechanism. In an example, the second hole 315 according to an embodiment may have the same shape as that of the second vibration generating module 500, or may have a tetragonal shape or a circular shape, but is not limited thereto.

The side cover part 330 may be bent from a periphery of the rear cover part 310, and may support the panel guide 200. The side cover part 330 may provide a backlight accommodating space on the rear cover part 310, and may surround side surfaces of the backlight unit 130 accommodated into (or supported by) the backlight accommodating space. The side cover part 330 may transfer a sound vibration, generated in the rear cover part 310 by the second vibration generating module 500, to the panel guide 200.

The rear cover 300 may further include a reinforcement part 350. The reinforcement part 350 may reinforce a stiffness of the rear cover 300, and thus may be referred to as a "stiffness reinforcement part", but is not limited thereto. The reinforcement part 350 may be disposed in a region (or a connection region) in which the rear cover part 310 intersects the side cover part 330. For example, the reinforcement part 350 may be provided along the periphery region EA of the rear cover part 310. The reinforcement part 350 may protrude toward a rear direction to have an inclined surface inclined from an end portion of the rear cover part 310. When the rear cover 300 includes the reinforcement part 350, the side cover part 330 may be connected to and/or integral with the end portion of the reinforcement part 350.

The first vibration generating module 400 may be disposed in the first rear region of the rear cover 300, and may vibrate a first region of the display module 100. For example, the first region of the display module 100 may overlap the center portion CP or the periphery portion EP of the display module 100, or the first region of the display module 100 may be the center portion CP or the periphery portion EP of the display module 100.

The first vibration generating module 400 according to an embodiment of the present disclosure may be disposed in a middle region MA of the rear cover 300, and may vibrate the center portion CP of the display module 100. The first vibration generating module 400 may generate a sound pressure between the display module 100 and the rear cover 300 in the center portion CP of the display module 100, and may vibrate the center portion CP of the display module 100 with the sound pressure to generate a first sound S1 of a first sound band in the center portion CP of the display module 100. The first sound S1 of the first sound band according to an embodiment may have a frequency of a low-pitched sound band. For example, the low-pitched sound band may be 200 Hz or less, but is not limited thereto, and may be 3 kHz or less.

The first vibration generating module 400 according to an embodiment may be coupled to or disposed on a middle region MA among the rear cover part 310 of the rear cover 300. For example, the first vibration generating module 400 may be coupled to or disposed in the first supporting region SA1 in the middle region MA of the rear cover part 310. Therefore, in response to a sound signal (or a voice signal) input from the outside, the first vibration generating module 400 may vibrate the middle region MA of the rear cover part 310 to generate a sound pressure, and may vibrate the center portion CP of the display panel 110 with the sound pressure to generate the first sound S1 of the first sound band. The first vibration generating module 400 according to an embodiment may include a sound actuator or a sound exciter, but is not limited thereto. In an example, the first vibration generating module 400 may be implemented as a sound generating device using a coil (or a voice coil) and a magnet.

The first vibration generating module 400 according to an embodiment may include a first sound generating unit 410 and a second sound generating unit 430. The first sound generating unit 410 may vibrate a first center portion C1 of the center portion CP of the display module 100 to output the first sound S1 of the first sound band to the forward region FD in front of the display panel 110. The first sound generating unit 410 may be disposed in the first supporting region SA1 in a first middle region MA1 of the middle region MA of the rear cover part 310. In an example, the first sound generating unit 410 may be disposed in or coupled to the rear cover part 310 to cover the first hole 313 in the first supporting region SA1 among the first middle region MA1 of the rear cover part 310.

The first sound generating unit 410 according to an embodiment may vibrate the first middle region MA1 of the rear cover part 310 in response to the sound signal to generate a sound pressure in an inner portion (or a first gap) of the first hole 313, and thus, may vibrate the first center portion C1 of the display module 100 to generate the first sound ST of the first sound band. For example, when the first sound generating unit 410 vibrates according to the sound signal, the first middle region MA1 of the rear cover part 310 may vibrate based on the vibration of the first sound generating unit 410 to generate a sound pressure in the first hole 313, the backlight unit 130 may vibrate based on the generated sound pressure to generate a sound pressure in the sound transfer space STS, and the first center portion C1 of the display panel 110 may vibrate based on the sound pressure transferred to the sound transfer space STS to generate the first sound ST of the first sound band, thereby outputting the first sound ST of the first sound band to the forward region FD in front of the display panel 110. Accordingly, the sound pressure generated based on the vibration of the first sound generating unit 410 may be directly transferred (or propagated) to the display module 100 through the first hole 313, thereby enhancing the sound pressure characteristic and sound quality of the first sound S1.

The second sound generating unit 430 may vibrate a second center portion C2 of the center portion CP of the display module 100 to output the first sound S1 of the first sound band to the forward region FD in front of the display panel 110. The second sound generating unit 430 may be in the first supporting region SA1 in a second middle region MA2 among the middle region MA of the rear cover part 310. In an example, the second sound generating unit 430 may be disposed in or coupled to the rear cover part 310 to cover the first hole 313 in the first supporting region SA1 in the second middle region MA2 of the rear cover part 310.

The second sound generating unit 430 according to an embodiment may vibrate the second middle region MA2 of the rear cover part 310 in response to the sound signal to generate a sound pressure in the inner portion (or the first gap) of the first hole 313, and thus, may vibrate the second center portion C2 of the display module 100 to generate the first sound S1 of the first sound band. For example, when the second sound generating unit 430 vibrates according to the sound signal, the second middle region MA2 of the rear cover part 310 may vibrate based on the vibration of the second sound generating unit 430 to generate a sound pressure in the first hole 313, the backlight unit 130 may vibrate based on the generated sound pressure to generate a sound pressure in the sound transfer space STS, and the second center portion C2 of the display panel 110 may vibrate based on the sound pressure transferred to the sound transfer space STS to generate the first sound S1 of the first sound band, thereby outputting the first sound S1 of the first sound band to the forward region FD in front of the display panel 110. Accordingly, the sound pressure generated based on the vibration of the second sound generating unit 430 may be directly transferred (or propagated) to the display module 100 through the first hole 313, thereby enhancing the sound pressure characteristic and sound quality of the first sound S1.

A position of each of the first sound generating unit 410 and the second sound generating unit 430 according to an embodiment may be adjusted based on a combination of sounds that are based on realization of a stereo sound or harmony with a sound generated by a vibration of each of the first sound generating unit 410 and the second sound generating unit 430. In an example, with respect to the first direction X (or the widthwise direction) of the display module 100, the first sound generating unit 410 and the second sound generating unit 430 may be disposed in a symmetrical or asymmetrical structure with respect to the center line CL of the display module 100.

The first sound generating module 400 may include one sound generating unit 410 disposed in a center portion of the rear cover part 310 so that the first sound S1 of the low-pitched sound band, generated based on the vibration of the display panel 110 corresponding to the vibration of the rear cover part 310, is directly transferred to a listener through air, but embodiments are not limited thereto.

The second vibration generating module 500 may be disposed in the second rear region of the rear cover 300, and may vibrate a second region of the display module 100. In an example, the second rear region of the rear cover 300 may be a portion other than a first rear region in the center portion CP and the periphery portion EP of the display module 100, and the second region of the display module 100 may be a portion other than a first region in the center portion CP and the periphery portion EP of the display module 100. In an example, the second rear region of the rear cover 300 may overlap a portion other than a portion overlapping a first rear region in the center portion CP and the periphery portion EP of the display module 100, and the second region of the display module 100 may be a portion other than a first region in the center portion CP and the periphery portion EP of the display module 100.

The second vibration generating module 500 may be disposed in the periphery region EA of the rear cover 300, and may vibrate the periphery portion EP of the display module 100. The second vibration generating module 500 may generate a sound vibration in the periphery portion EP of the display module 100. The second vibration generating module 500 may generate the second sound S2 of the second sound band, which differs from the first sound S1 of the first sound band generated in the center portion CP of the display module 100, in the periphery portion EP of the display module 100. The second sound S2 of the second sound band according to an embodiment may have a frequency of a middle-high-pitched sound band or a high-pitched sound band. For example, a middle-pitched sound band may be 200 Hz to 3 kHz, but is not limited thereto, and may be 3 kHz to 5 kHz. The high-pitched sound band may be 3 kHz or more, but is not limited thereto, and may be 5 kHz or more.

The second vibration generating module 500 according to an embodiment may be coupled to or disposed in the periphery region EA among the rear cover part 310 of the rear cover 300. For example, the second vibration generating module 500 may be coupled to or disposed in the second supporting region SA2 in the periphery region EA of the rear cover part 310. Therefore, in response to the sound signal (or the voice signal) input from the outside, the second vibration generating module 500 may vibrate the periphery region EA of the rear cover part 310 to generate a sound pressure, and may vibrate the periphery portion EP of the display module 100 with the sound pressure to generate the second sound S2 of the second sound band. The second vibration generating module 500 may include a piezoelectric element or a piezoelectric material each having a piezoelectric effect (or an inverse piezoelectric characteristic).

The second vibration generating module 500 may include a first piezoelectric vibration unit 510 and a second piezoelectric vibration unit 530. The first piezoelectric vibration unit 510 may vibrate a first periphery portion EP1 (or a left periphery portion) of the periphery portion EP of the display module 100 to output the second sound S2 of the second sound band to the forward region FD in front of the display panel 110. The first piezoelectric vibration unit 510 may be disposed in a second supporting region SA2 disposed in a first periphery region (or a left periphery region) EA1 of the periphery region EA of the rear cover part 310. For example, the first piezoelectric vibration unit 510 may be disposed in or coupled to the rear cover part 310 to cover the second hole 315 in the second supporting region SA2 disposed in the first periphery region EA1 of the rear cover part 310.

The first piezoelectric vibration unit 510 according to an embodiment may vibrate the first periphery region EA1 of the rear cover part 310 in response to the sound signal to sound-vibrate the first periphery portion EP1 of the display panel 110, thereby generating the second sound S2 of the second sound band in the first periphery portion EP1 of the display panel 110. For example, when the first piezoelectric vibration unit 510 vibrates according to the sound signal, the sound vibration that is generated in the first periphery region EA1 of the rear cover part 310 based on the vibration of the first piezoelectric vibration unit 510 may be transferred to the first periphery portion EP1 of the display panel 110 through the side cover part 330 of the rear cover 300 and the panel guide 200, the first periphery portion EP1 of the display panel 110 may vibrate based on the sound vibration transferred through the panel guide 200 to generate the second sound S2 of the second sound band, and the second sound S2 of the second sound band may be output to the forward region FD in front of the display panel 110. Accordingly, a sound pressure generated based on the vibration of the first piezoelectric vibration unit 510 may be directly transferred (or propagated) to the first periphery portion EP1 of the display module 100, thereby enhancing the sound pressure characteristic and sound quality of the second sound S2. A vibration of the first periphery region EA1 of the rear cover part 310 based on the vibration of the first piezoelectric vibration unit 510 may be reduced, thereby further enhancing the sound pressure characteristic and sound quality of the second sound S2.

The first piezoelectric vibration unit 510 according to an embodiment may be disposed close to the side cover part 330 of the rear cover 300 so that a second sound S2 of the high-pitched sound band, generated based on a sound vibration of the first periphery portion EP1 of the display panel 110 that is caused by a sound vibration of the first periphery region EA1 of the rear cover part 310, is directly transferred to the listener. For example, the first piezoelectric vibration unit 510 may be disposed in the first periphery region EA1 of the rear cover part 310 to overlap the panel supporting part 210 of the panel guide 200 that supports the first periphery portion EP1 of the display panel 110.

The first piezoelectric vibration unit 510 according to an embodiment may be disposed on a horizontal line (or a center horizontal line) HL of the rear cover part 310 with respect to a lengthwise direction (or a vertical direction) of the rear cover part 310 parallel to the second direction Y. For example, the first sound generating unit 410 of the first vibration generating module 400 according to an embodiment may be disposed on the same line as the first piezoelectric vibration unit 510, or may be disposed above or under the horizontal line (or the center horizontal line) HL parallel to the first direction X, with respect to the second direction Y. For example, a center portion of the first sound generating unit 410 may be disposed on the horizontal line HL that extends from the center portion of the first piezoelectric vibration unit 510 in parallel with the first direction X. As another example, the center portion of the first sound generating unit 410 may be disposed under or above the horizontal line (or the center horizontal line) HL with respect to the second direction Y. The center portion of the first sound generating unit 410 may be disposed under rather than on the horizontal line (or the center horizontal line) HL with respect to the second direction Y so that a first sound S1 of the low-pitched sound band generated based on a vibration of the first center region C1 of the center portion CP of the display module 100 is directly transferred to the listener.

The first piezoelectric vibration unit 510 according to an embodiment may include a first piezoelectric element 511 attached on the rear cover part 310 by a first adhesive member 513. The first piezoelectric element 511 may include a piezoelectric material layer having a piezoelectric effect.

The piezoelectric material layer may include a piezoelectric material that vibrates with an electric field. The piezoelectric material may have a characteristic in which as pressure is applied to, or twisting occurs in, a crystalline structure due to an external force, a potential difference is caused by dielectric polarization based on a relative position change of a positive (+) ion and a negative (−) ion, and vibration occurs due to an electric field based on an applied voltage.

The piezoelectric material layer according to an embodiment may include a polymer material-containing piezoelectric material, a thin film material-containing piezoelectric material, a composite material-containing piezoelectric material, or a single crystalline ceramic or polycrystalline ceramic-containing piezoelectric material. Examples of the polymer material-containing piezoelectric material may include polyvinylidene fluoride (PVDF), polyvinylidene fluoride trifluoroethylene P(VDF-TrFe), and polyvinylidene fluoride-tetrafluoroethylene P(VDFTeFE). Examples of the thin film material-containing piezoelectric material may include ZnO, CdS, and AlN. Examples of the composite material-containing piezoelectric material may include PZT-PVDF, PZT-silicon rubber, PZT-epoxy, PZT-foam polymer, and PZT-foam urethane. Examples of the single crystalline ceramic-containing piezoelectric material may include $\alpha$-$AlPO_4$, $\alpha$-$SiO_2$, $LiNbO_3$, $Tb_2(MoO_4)_3$, $Li_2B_4O_7$, and ZnO. Examples of the polycrystalline ceramic-containing piezoelectric material may include a PZT-based material, a PT-based material, a PZT-complex Perovskite-based material, and $BaTiO_3$.

The first piezoelectric element 511 according to an embodiment may have a first length parallel to the first direction X and a second length parallel to the second direction Y. For example, the first length of the first piezoelectric element 511 may be shorter than the second length, but is not limited thereto, and may be equal to or longer than the second length.

The first adhesive member 513 may include a double-sided tape or a naturally curable adhesive. The first adhesive member 513 may include a thermocurable adhesive or a photocurable adhesive. In an example, a characteristic of the first piezoelectric element 511 may be reduced by heat used in a curing process of curing the first adhesive member 513.

The first piezoelectric vibration unit 510 according to an embodiment may further include a first protection member 515 attached on a rear surface of the first piezoelectric element 511. The first protection member 515 may have a size that is wider than the first piezoelectric element 511, and may be attached on the rear surface of the first piezoelectric element 511. The first protection member 515 may prevent the first piezoelectric element 511 from being damaged by a physical impact and/or an electrical impact such as static electricity. For example, the first piezoelectric element 511 may be damaged by static electricity that occurs in the display module 100 such as in a panel driving circuit unit or as flows in from the outside, or may be damaged by physical contact with the display module 100 caused by pressing of the display module 100. Therefore, the first protection member 515 may be between the display module 100 and the first piezoelectric element 511, and may thereby cut off static electricity that would otherwise be transferred to the first piezoelectric element 511 through the display module 100. Thus, the first protection member 515 may protect the first piezoelectric element 511 from the static electricity, and may also protect the first piezoelectric element 511 from a physical impact applied to the first piezoelectric element 511. The first protection member 515 according to an embodiment may include a single-sided insulation tape or an insulation single-sided foam tape each including an adhesive layer attached on the rear surface of the first piezoelectric element 511. In an example, the first protection member 515 may be a polyethylene terephthalate (PET) insulation tape or a polyvinyl chloride (PVC) insulation tape.

The second piezoelectric vibration unit 530 may vibrate a second periphery portion EP2 (or a right periphery portion) among the periphery portion EP of the display module 100 to output the second sound S2 of the second sound band to the forward region FD in front of the display panel 110. The second piezoelectric vibration unit 530 may be in a second supporting region SA2 in a second periphery region (or a right periphery region) EA2 among the periphery region EA of the rear cover part 310. For example, the second piezoelectric vibration unit 530 may be disposed in or coupled to the rear cover part 310 to cover the second hole 315 in a second supporting region SA2 among the second periphery region EA2 of the rear cover part 310.

The second piezoelectric vibration unit 530 according to an embodiment may vibrate the second periphery region EA2 of the rear cover part 310 in response to the sound signal to sound-vibrate the second periphery portion EP2 of the display panel 110, thereby generating the second sound S2 of the second sound band in the second periphery portion EP2 of the display panel 110. For example, when the second piezoelectric vibration unit 530 vibrates according to the sound signal, the sound vibration that is generated in the second periphery region EA2 of the rear cover part 310 based on the vibration of the second piezoelectric vibration unit 530 may be transferred to the second periphery portion EP2 of the display panel 110 through the side cover part 330 of the rear cover 300 and the panel guide 200, the second periphery portion EP2 of the display panel 110 may vibrate based on the sound vibration transferred through the panel guide 200 to generate the second sound S2 of the second sound band, and the second sound S2 of the second sound band may be output to the forward region FD in front of the display panel 110. Accordingly, a sound pressure generated based on the vibration of the second piezoelectric vibration unit 530 may be directly transferred (or propagated) to the second periphery portion EP2 of the display module 100, thereby enhancing the sound pressure characteristic and sound quality of the second sound S2. A vibration of the second periphery region EA2 of the rear cover part 310 based on the vibration of the second piezoelectric vibration unit 530 may be reduced, thereby further enhancing the sound pressure characteristic and sound quality of the second sound S2.

The second piezoelectric vibration unit 530 according to an embodiment may be in the second periphery region EA2 of the rear cover part 310 to be symmetrical with the first piezoelectric vibration unit 510 with respect to the center line CL of the display module 100, or may be provided at another position.

A position of each of the first piezoelectric vibration unit 510 and the second piezoelectric vibration unit 530 according to an embodiment may be set based on realization of a stereo sound or harmony with a sound generated by a vibration of each of the first piezoelectric vibration unit 510 and the second piezoelectric vibration unit 530. For example, with respect to the first direction X (or the widthwise direction) of the display module 100, the first piezoelectric vibration unit 510 and the second piezoelectric vibration unit 530 may be disposed in a symmetrical or asymmetrical structure with respect to the center line CL of the display module 100.

The second piezoelectric vibration unit 530 according to an embodiment may include a second piezoelectric element 531 attached on the rear cover part 310 by a second adhesive member 533.

The second piezoelectric element 531 may include a piezoelectric material layer having a piezoelectric effect. The second piezoelectric element 531 may have substantially the same configuration (or structure) as that of the first piezoelectric element 511 of the first piezoelectric vibration unit 510, and thus, repetitive description may be omitted.

The second adhesive member 533 may include a double-sided tape or a naturally curable adhesive. The second adhesive member 533 may include a thermocurable adhesive or a photocurable adhesive, and for example, a characteristic of the second piezoelectric element 531 may be reduced by heat used in a curing process of curing the second adhesive member 533.

The second piezoelectric vibration unit 530 according to an embodiment may further include a second protection member 535 attached on a rear surface of the second piezoelectric element 531. The second protection member 535 may be provided to have a size that is wider than the second piezoelectric element 531, and may be attached on the rear surface of the second piezoelectric element 531. The second protection member 535 may prevent the second piezoelectric element 531 from being damaged by a physical impact and/or an electrical impact such as static electricity. The second protection member 535 may be substantially the same as a configuration (or a structure) of the first protection member 515, and thus, its repetitive description is omitted.

The display apparatus according to an embodiment of the present disclosure may further include a system rear cover 600 on a rear surface of the rear cover 300. The system rear cover 600 may accommodate the display module 100 coupled or connected to the first and second vibration modules 400 and 500, and may surround the side surfaces of the display module 100. In an example, the system rear cover 600 may be referred to as a "set" cover, a "rear set" cover, an "outermost set" cover, a "product" cover, or an "outermost product" cover, but is not limited thereto.

The system rear cover 600 according to an embodiment may include a rear structure 610 and a side structure 630. The rear structure 610 may be an outermost rear mechanism on a rear surface of the display apparatus. The rear structure 610 may support (or accommodate) the display module 100, and may cover the rear surface of the display module 100.

The side structure 630 may be an outermost side mechanism on a side surface of the display apparatus, and may be connected to and/or integral with a periphery of the rear structure 610 to cover the side surfaces of the display module 100.

Figure 5A:
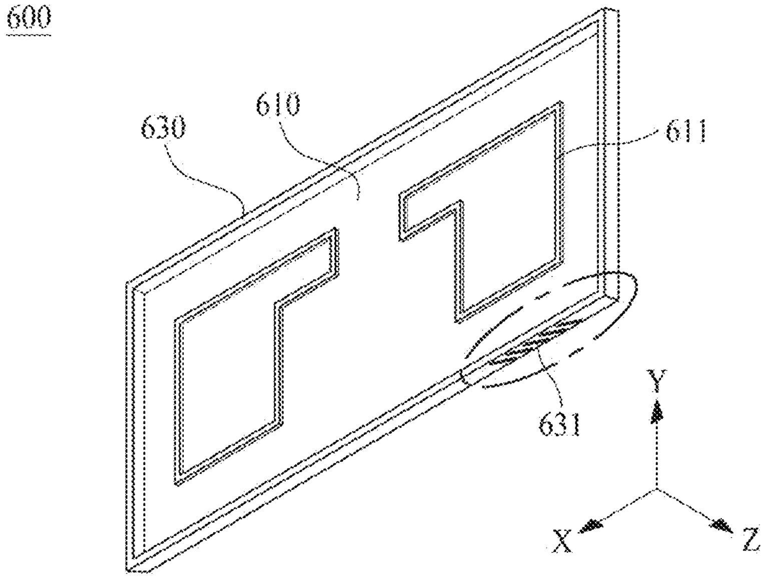
FIG. 5A illustrates a system rear cover illustrated in FIG. 1.
Figure 5B:
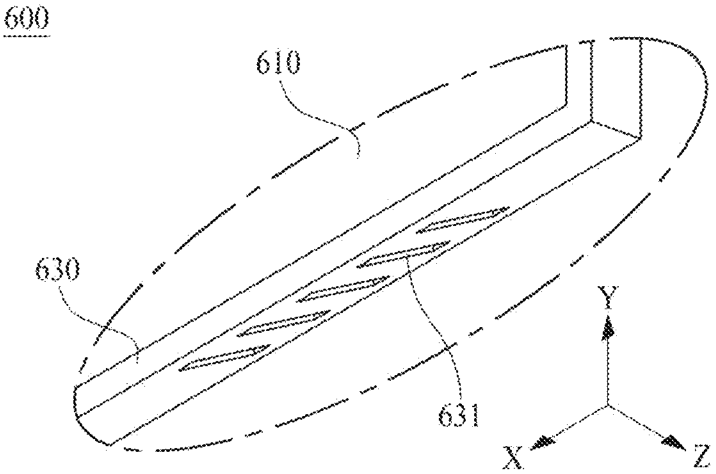
FIG. 5B is an enlarged view of a duct in a system rear cover of FIG. 5A.

FIG. 5A illustrates a system rear cover illustrated in FIG. 1, and FIG. 5B is an enlarged view of a duct in a system rear cover of FIG. 5A.

With reference to FIGS. 5A and 5B in conjunction with FIG. 4, in the system rear cover 600 according to an embodiment of the present disclosure, a system rear structure 610 may further include a system rear cover box 611 that accommodates the first vibration generating module 400 and the rear cover hole 311.

The system rear cover box 611 may be implemented on an inner surface of the system rear structure 610 to wholly surround the first vibration generating module 400 and the rear cover hole 311. The system rear cover box 611 may provide a space (or a sealed space) between the rear cover part 310 and the system rear structure 610, and thus, may enhance a sound pressure generated by the first vibration generating module 400, and may amplify a first sound of a first sound band, thereby enhancing a characteristic of the first sound. The system rear cover box 611 may be coupled or connected to the rear cover part 310 to define or seal a peripheral space of the first vibration generating module 400, and thus, may separate a peripheral space of the first vibration generating module 400 from another rear space of the rear cover part 310, and a peripheral rear space of the first vibration generating module 400 may amplify a low-pitched sound generated based on a vibration of the first vibration generating module 400.

The system rear cover box 611 may be coupled or connected to the rear cover part 310 of the rear cover 300, and may be a partition that acoustically seals or separates a space in which the first vibration generating module 400 and the rear cover hole 311 are disposed. Also, in the present disclosure, a low-pitched sound generated by the first vibration generating module 400 may be used, and a sound pressure generated by the first vibration generating module 400 may be amplified through a resonance effect occurring in the inside of the system rear cover box 611. For example, the system rear cover box 611 may be referred to as a "sound box," a "sound part," or a "resonance part."

The display apparatus according to an embodiment of the present disclosure, as illustrated in FIG. 4, may further include a sealing member 700 that further seals a coupled portion (or a contact portion) at which the system rear cover box 611 is coupled to the rear cover part 310.

The sealing member 700 may further acoustically seal the coupled portion at which the system rear cover box 611 is coupled to the rear cover part 310.

The sealing member 700 according to an embodiment may be provided to cover the coupled portion at which the system rear cover box 611 is coupled to the rear cover part 310. According to another embodiment, the sealing member 700 may be inserted or accommodated into at least a portion of the coupled portion at which the system rear cover box 611 is coupled to the rear cover part 310, and may be filled into an empty gap that is formed in the coupled portion between the system rear cover box 611 and the rear cover part 310, thereby further enhancing a sealable degree between the system rear cover box 611 and the rear cover part 310. Therefore, a space formed by the system rear cover box 611 and the rear cover part 310 may provide an air layer for enhancing a low-pitched sound generated by the first vibration generating module 400, and may prevent or reduce and possibly minimize the leakage (or loss) of a sound pressure.

The sealing member 700 according to an embodiment may include a silicon-based sealant or ultraviolet (UV)-curable sealant (or resin), and for example, may include the UV-curable sealant, but is not limited thereto. For example, the sealing member 700 may use all materials for further acoustically sealing the coupled portion at which the system rear cover box 611 is coupled to the rear cover part 310.

The system rear cover 600 according to an embodiment of the present disclosure may further include a system rear cover duct 631.

The system rear cover duct 631 may amplify a low-pitched sound by using a flow of air caused by a vibration of the first vibration generating module 400. The system rear cover duct 631 may amplify the low-pitched sound by using the flow of air that occurs when the first vibration generating module 400 vibrates in a reverse direction (or a rearward direction). For example, when the system rear cover duct 631 is not in the system rear cover 600, flows of air occurring whenever the first vibration generating module 400 vibrates in the reverse direction may be offset against one another or may be lost. On the other hand, when the system rear cover duct 631 is in the system rear cover 600, flows of air occurring whenever the first vibration generating module 400 vibrates in the reverse direction may be smooth by using the system rear cover duct 631, and the flows of air may be used to amplify the low-pitched sound without being offset against one another or lost. Thus, according to an embodiment of the present disclosure, by using the system rear cover duct 631, flows of air occurring whenever the first vibration generating module 400 vibrates in the reverse direction may be used to amplify the low-pitched sound, thereby enhancing and possibly maximizing a sound pressure characteristic of the low-pitched sound. For example, the system rear cover duct 631 may be referred to as a "sound discharging hole" or a "vent hole," but is not limited thereto.

The system rear cover duct 631 according to an embodiment may be in at least a portion among the side structure 630 of the system rear cover 600. For example, the side structure 630 may include first to fourth sidewalls, and the system rear cover duct 631 may be provided on the first sidewall (or a lower portion), facing the ground, among the first to fourth sidewalls of the side structure 630, but is not limited thereto. The system rear cover duct 631 may be provided on at least one of the first to fourth sidewalls of the side structure 630, based on realization of a stereo sound or harmony with a sound generated by a vibration of each of the first and second vibration generating modules 400 and 500.

Figure 6:
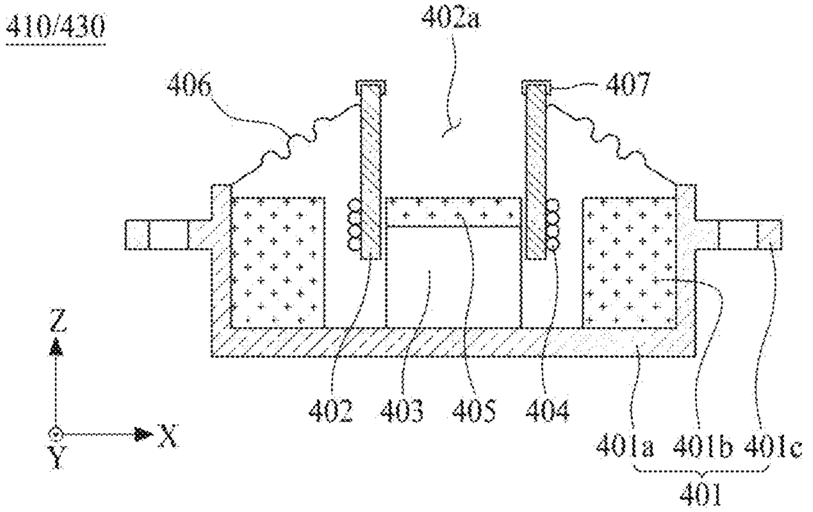
FIG. 6 illustrates first and second sound generating units of a first vibration generating module illustrated in FIGS. 2-4.

FIG. 6 illustrates the first and second sound generating units of the first vibration generating module illustrated in FIGS. 3-4.

With reference to FIGS. 3 and 6, the first and second sound generating units 410 and 430 according to the present disclosure may each include a module frame 401, a bobbin 402, a magnet member 403, a coil 404, a center pole 405, and a damper 406. In an example, in each of the first and second sound generating units 410 and 430, the module frame 401 may be referred to as a "fixing part" fixed to the rear cover 300, and each of the bobbin 402, the magnet member 403, the coil 404, the center pole 405, and the damper 406 may be referred to as a "vibration part" for vibrating the display module 100. However, the present embodiment is not limited thereto.

The module frame 401 may be supported by the rear cover part 310. The module frame 401 may include a frame body 401*a*, an upper plate 401*b*, and a fixing bracket 401*c*. The frame body 401*a* may be fixed to the rear cover part 310, and the frame body 401*a* may act as a lower plate, which may support the magnet member 403.

The upper plate 401*b* may protrude to a periphery of a front surface the frame body 401*a*, e.g., to have a cylindrical shape including a hollow portion. Therefore, the frame body 401*a* and the upper plate 401*b* may be provided as one body having a U-shape. The frame body 401*a* and the upper plate 401*b* are not limited to these terms, and may each be referred to as a "yoke," etc.

The fixing bracket 401*c* may protrude from a side surface of the upper plate 401*b*. The fixing bracket 401*c* may be fixed to the rear cover part 310 by a second coupling or connection member, and thus, the module frame 401 may be fixed to the rear cover part 310.

The second connection member may be a screw or a bolt, which may pass through the fixing bracket 401*c*, and may be coupled or connected to the rear cover part 310 of the rear cover 300. For example, a buffering ring may be between the rear cover part 310 of the rear cover 300 and the fixing bracket 401*c*, and the buffering ring may prevent a vibration of the rear cover part 310 from being transferred to the module frame 401.

The bobbin 402 may be on the module frame 401, and may vibrate the rear cover part 310 of the rear cover 300. The bobbin 402 may have a cylindrical shape including the hollow portion 402*a*, and may be coupled or connected to a rear surface of the rear cover part 310. For example, the bobbin 402 may have a ring structure, which may be formed of a material, e.g., produced by processing pulp or paper; Al or Mg or an alloy thereof, synthetic resin, such as polypropylene; or a polyamide-based fiber, etc. Embodiments are not limited to these examples. The bobbin 402 may vibrate based on a magnetic force, and for example, may perform a vertical reciprocating motion, thereby vibrating the rear cover 300 near the first hole 313 in the rear cover 300.

The bobbin 402 according to an embodiment may have an elliptical or oval shape, but is not limited thereto. The bobbin 402 having the oval shape may have an elliptical shape, a corners-rounded rectangular shape, or a non-circular curved shape having a width different from its height, but is not limited thereto. For example, in the bobbin 402 having the oval shape, a ratio of a long-axis diameter and a short-axis diameter may be 1.3:1 to 2:1. The bobbin 402 having the oval shape may further improve a sound of the high-pitched sound band over the circular shape, and may reduce heat caused by a vibration. Thus, the bobbin 402 having the oval shape may have a good heat dissipation characteristic.

The magnet member 403 may be provided on the module frame 401 to be accommodated into the hollow portion 402*a* of the bobbin 402. The magnet member 403 may be a permanent magnet having a cylindrical shape to be accommodated into the hollow portion 402*a* of the bobbin 402. For example, the magnet member 403 may be implemented, e.g., with a sintered magnet, such as barium ferrite, and a material of the magnet member 403 may include one or more of: ferric oxide ($Fe_2O_3$); barium carbonate (or witherite) ($BaCO_3$); neodymium (Nd); strontium ferrite ($Fe_{12}O_{19}Sr$), e.g., with an improved magnet component; and an alloy cast magnet including aluminum (Al), nickel (Ni), cobalt (Co), and/or the like. As another example, the neodymium magnet may be neodymium-iron-boron (Nd—Fe—B). However, embodiments are not limited to these examples.

The coil 404 may be wound to surround a lower outer circumference surface of the bobbin 402, and may be supplied with a sound signal (or a voice signal) from the outside. The coil 404 may be raised or lowered along with the bobbin 402. For example, the coil 404 may be referred to as a "voice coil," but is not limited thereto. When a sound signal (or a current) is applied to the coil 404, a whole portion of the bobbin 402 may vibrate, (for example, may perform a vertical reciprocating motion) according to Fleming's left hand rule based on an application magnetic field generated around the coil 404 and an external magnetic field generated around the magnet member 403.

The center pole 405 may be on the magnet member 403, and may guide a vibration of the bobbin 402. For example, the center pole 405 may be inserted or accommodated into the hollow portion of the bobbin 402 having a cylindrical shape, and may be surrounded by the bobbin 402. In an example, the center pole 405 may be referred to as an "elevation guider" or "pole pieces," but is not limited thereto.

The damper 406 may be between the module frame 401 and the bobbin 402. For example, the damper 406 may be between the frame body 401*a* of the module frame 401 and an upper outer circumference surface of the bobbin 402. The damper 406 may be provided in a creased structure that may be creased between one end and the other end thereof, and may be contracted and relaxed based on a vibration of the bobbin 402. A vibration distance (or a vertical movement distance) of the bobbin 402 may be limited by a restoring force of the damper 406. For example, when the bobbin 402 vibrates by a certain distance or more or vibrates by a certain distance or less, the bobbin 402 may be restored to an original position by the restoring force of the damper 406. Also, the damper 406 may be referred to as a "spider," a "suspension," or an "edge," but is not limited thereto.

Each of the first and second sound generating units 410 and 430 according to an embodiment may be described as an internal magnetic type such that the magnet member 403 may be inserted into the hollow portion 402*a* of the bobbin 402.

As another example, each of the first and second sound generating units 410 and 430 according to an embodiment may be described as an external magnetic type (or a dynamic type) such that the magnet member 403 is disposed to surround an outer portion of the bobbin 402. For example, except for that the magnet member 403 may be provided between the frame body 401*a* and the upper plate 401*b*, and the center pole 405 may be provided on the frame body 401*a* to be inserted into the hollow portion of the bobbin 402, the external magnetic type sound generating units 410 and 430 may be substantially similar to the internal magnetic type. Thus, a detailed description thereof may be omitted.

Each of the first and second sound generating units 410 and 430 according to an embodiment of the present disclosure may further include a bobbin protection member 407 between an upper portion of the bobbin 402 and the rear cover part 310 of the rear cover 300. The bobbin protection member 407 may be provided in a cylindrical structure including an opening overlapping the hollow portion 402*a* of the bobbin 402, and may be coupled to an upper surface of the bobbin 402. The bobbin protection member 407 may cover the upper surface of the bobbin 402 to protect the bobbin 402, thereby preventing deformation of the bobbin 402 caused by an external impact.

The bobbin protection member 407 may be provided in a molding form of an injection material or a mold product of metal. In an example, the bobbin protection member 407 may include a textile reinforced material, a composite resin including a textile reinforced material, or metal, and for example, may have a heat dissipation function of dissipating heat occurring when the first and second sound generating units 410 and 430 are being driven. The textile reinforced material may be one of carbon fiber reinforced plastics (CFRP), glass fiber reinforced plastics (GFRP), and graphite fiber reinforced plastics (GFRP), or a combination thereof, but is not limited thereto.

The bobbin protection member 407 may be coupled or connected to the bobbin 402 by a double-sided tape or an adhesive resin. In an example, the adhesive resin may be an epoxy resin or an acryl resin, but is not limited thereto.

The bobbin protection member 407 may be coupled or connected to the rear cover part 310 of the rear cover 300 by a double-sided tape or an adhesive resin.

Figure 7:
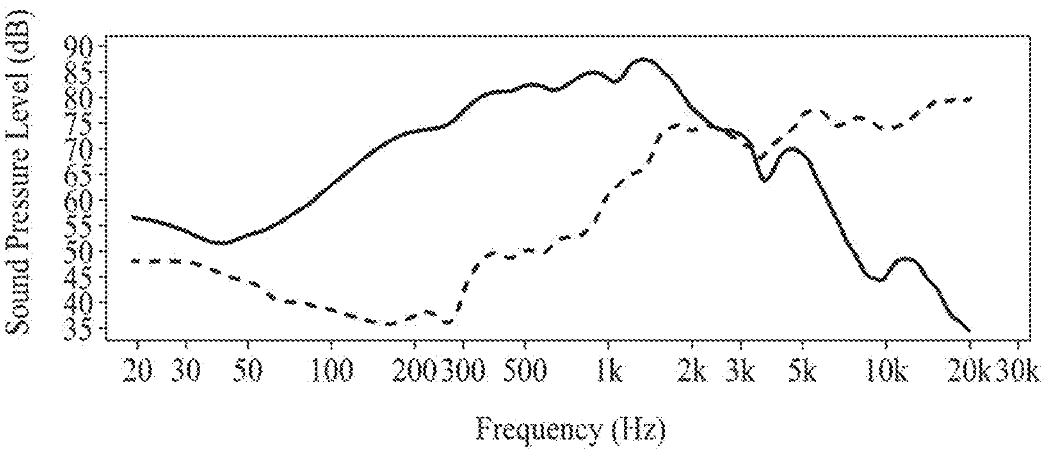
FIG. 7 is a graph showing a frequency and a sound pressure characteristic of each of a first vibration generating module and a second vibration generating module according to an embodiment of the present disclosure.

FIG. 7 is a graph showing a frequency-sound pressure level characteristic of each of the first vibration generating module 400 and the second vibration generating module 500. In FIG. 7, a solid line represents a frequency-sound pressure level characteristic of the first vibration generating module 400, and a dotted line represents a frequency-sound pressure level characteristic of the second vibration generating module 500. In FIG. 7, the abscissa axis represents a frequency (Hz), and the ordinate axis represents a sound pressure level (SPL) (dB).

As shown in FIG. 7, comparing with a frequency-sound pressure level characteristic (a dotted line) of the second vibration generating module 500, it may be shown that a frequency-sound pressure level characteristic (a solid line) of the first vibration generating module 400 is relatively good in a frequency of 3 kHz or less or the low-pitched sound band, and comparing with the frequency-sound pressure level characteristic (the solid line) of the first vibration generating module 400, it may be shown that the frequency-sound pressure level characteristic (the dotted line) of the second vibration generating module 500 is relatively good in a frequency of 3 kHz or more or the middle-high-pitched sound band. Therefore, the display apparatus according to an embodiment may include the first vibration generating module 400 having a relatively good low-pitched sound output characteristic for enhancing a sound of the low-pitched sound band generated based on a vibration of the display module, and may include the second vibration generating module 500 having a relatively good high-pitched sound output characteristic for enhancing a sound of the middle-high-pitched sound band generated based on the vibration of the display module.

Figure 8:
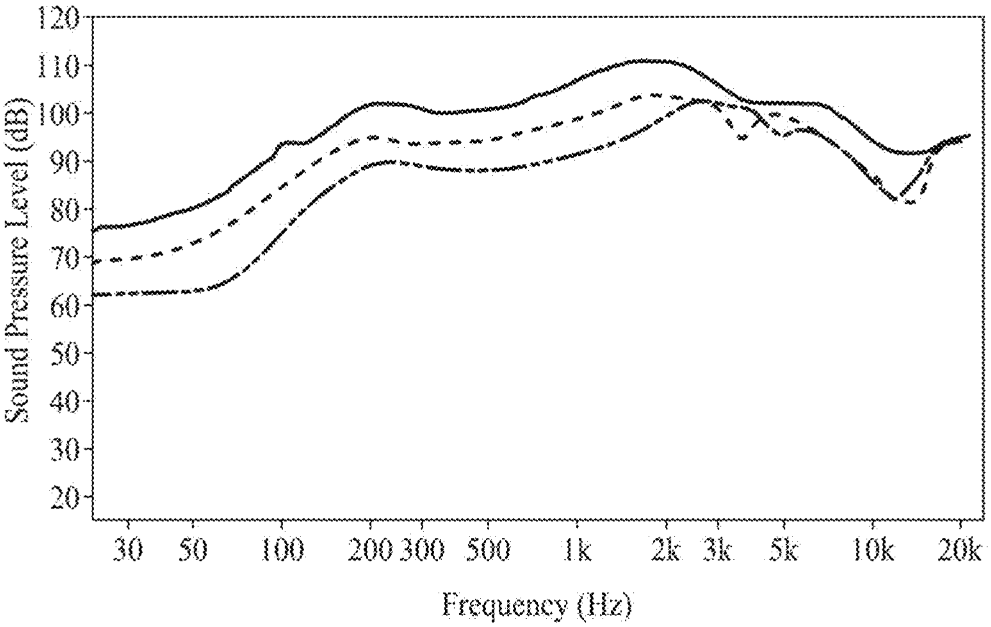
FIGS. 8 and 9 are graphs showing a sound output characteristic of a display apparatus according to an embodiment of the present disclosure.

FIG. 8 is a graph showing a sound output characteristic of a display apparatus according to an embodiment of the present disclosure. In FIG. 8, a two-dot dash line represents a graph showing a sound output characteristic of a display apparatus according to a comparative example to which the system rear cover box and the system rear cover duct each illustrated in FIG. 5A are not applied, a dotted line represents a graph showing a sound output characteristic of a display apparatus that includes only the system rear cover box illustrated in FIG. 5A, and a solid line represents a graph showing a sound output characteristic of a display apparatus to which the system rear cover box and the system rear cover duct each illustrated in FIG. 5A are all applied. In FIG. 8, the abscissa axis represents a frequency (Hz), and the ordinate axis represents a sound pressure level (SPL) (dB).

As shown in FIG. 8, comparing with a sound output characteristic (the two-dot dash line) of the display apparatus of the comparative example, it may be seen that, in a sound output characteristic (a dotted line) of a display apparatus including the system rear cover box, a sound pressure level characteristic is enhanced by about 10 dB in a frequency domain of about 3 kHz or less. Also, comparing with a sound output characteristic (a dotted line) of a display apparatus including only the system rear cover box 611, it may be shown that, in a sound output characteristic (a solid line) of a display apparatus including the system rear cover box and the system rear cover duct, a sound pressure level characteristic is enhanced by about 5 dB in a frequency domain of about 3 kHz or less, and moreover, is enhanced in a frequency or a middle-high-pitched sound band of more than 3 kHz.

Figure 9:
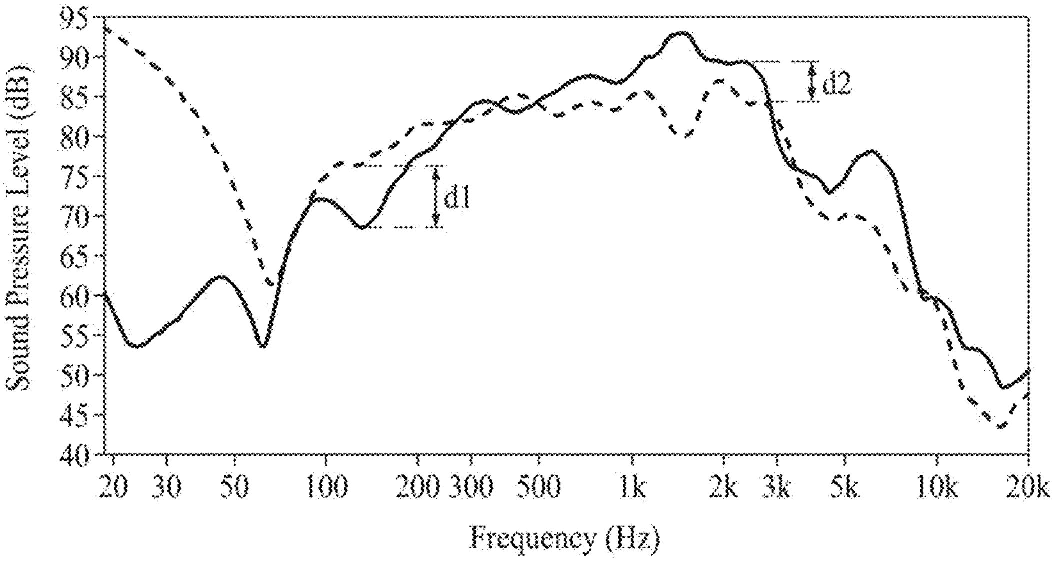

FIG. 9 is a graph showing a sound output characteristic of a display apparatus according to an embodiment of the present disclosure. In FIG. 9, a dotted line represents a graph showing a sound output characteristic of a display apparatus including a rear cover to which the first rear cover hole illustrated in FIGS. 2 to 4 is not applied, and a solid line represents a graph showing a sound output characteristic of a display apparatus including a rear cover to which the first rear cover hole illustrated in FIGS. 2 to 4 is applied. In FIG. 9, the abscissa axis represents a frequency (Hz), and the ordinate axis represents a sound pressure level (SPL) (dB).

A low-pitched sound area including a frequency of about 170 Hz is classified into noise or buzz, squeak, and rattle noises (BSR noises), and it may be required to improve such sounds and secure quality. Buzz noise may be a sound that is generated by a vibration plate of a vibration generating module like a drum, and may be noise that occurs when a unique vibration frequency of a vibrating vibrator is the same as a vibration frequency applied from the outside. Squeak noise may be a sound that is generated in a front-end direction by a friction between elements of a vibration generating module, and may be noise that occurs because coupling and separation of two vibrators are repeated when a horizontal displacement is generated in a surface after the two vibrators contact each other. Rattle noise may be a sound that is generated in a vertical direction by bumping of the elements of the vibration generating module, and may be noise that occurs because impact energy caused by collision between vibrators vibrating based on a vibration or a force each applied to the outside is discharged to air.

With reference to FIGS. 2 to 4, in a display apparatus including the first and second vibration generating modules 400 and 500, a sound vibration noise such as noise or BSR noise may occur due to a structural feature of the display apparatus, but may reduce a specific resonance frequency band by using the Helmholtz resonator configured by the rear cover hole 311, the rear cover part 310, and the first vibration generating module 400, and may reduce noise or BSR noise including a frequency of about 170 Hz. A structure of the Helmholtz resonator will be described below with reference to FIG. 10.

As shown in FIG. 9, comparing with a sound output characteristic (a dotted line) of a display apparatus including the rear cover 300 to which the rear cover hole 311 is not applied, it may be seen that, in a sound output characteristic (a solid line) of a display apparatus including the rear cover 300 to which the rear cover hole 311 is applied, a sound pressure level characteristic decreases by d1 in a frequency corresponding to about 170 Hz. This denotes that a resonance frequency of the Helmholtz resonator is set to about 170 Hz, and thus, a sound pressure level of a frequency corresponding to noise or BSR noise decreases due to resonance of the Helmholtz resonator.

As shown in FIG. 9, comparing with the sound output characteristic (the dotted line) of the display apparatus including the rear cover 300 to which the rear cover hole 311 is not applied, it may be seen that, in the sound output characteristic (the solid line) of the display apparatus including the rear cover 300 to which the rear cover hole 311 is applied, a sound pressure level is enhanced by d2 in a frequency corresponding to about 2.5 kHz. This is based on an air duct resistance generated by the rear cover hole 311 and the enhanced efficiency of the first vibration generating module 400 enhanced by a characteristic of the Helmholtz resonator.

The Helmholtz resonator configured by the rear cover hole 311, the rear cover part 310, and the first vibration generating module 400 may amplify or attenuate a specific frequency. Also, because the rear cover hole 311 is applied to the rear cover part 310, a change occurs due to flow of an air layer excited by the first vibration generating module 400, and thus, a change may occur due to a frictional force of flow. This may be associated with an efficiency of the first vibration generating module 400. A frictional force of flow caused by introduction of the rear cover hole 311 may be referred to as an “air duct resistance,” and an air duct may be understood as an opening that is provided in a path of flow like the rear cover hole 311. The air duct resistance will be described below with reference to FIG. 10.

Therefore, the Helmholtz resonator configured by the rear cover hole 311, the rear cover part 310, and the first vibration generating module 400 may have an effect of reducing noise or BSR in a set frequency. Also, the Helmholtz resonator may optimize a frictional force of flux caused by the first vibration generating module 400 to prevent an efficiency of the first vibration generating module 400 from being reduced. Accordingly, the rear cover hole 311 may be provided at an optimal position, a sound pressure level may be enhanced in all of a certain frequency or the low-pitched sound band, the middle-pitched sound band, and the high-pitched sound band.

Figure 10:
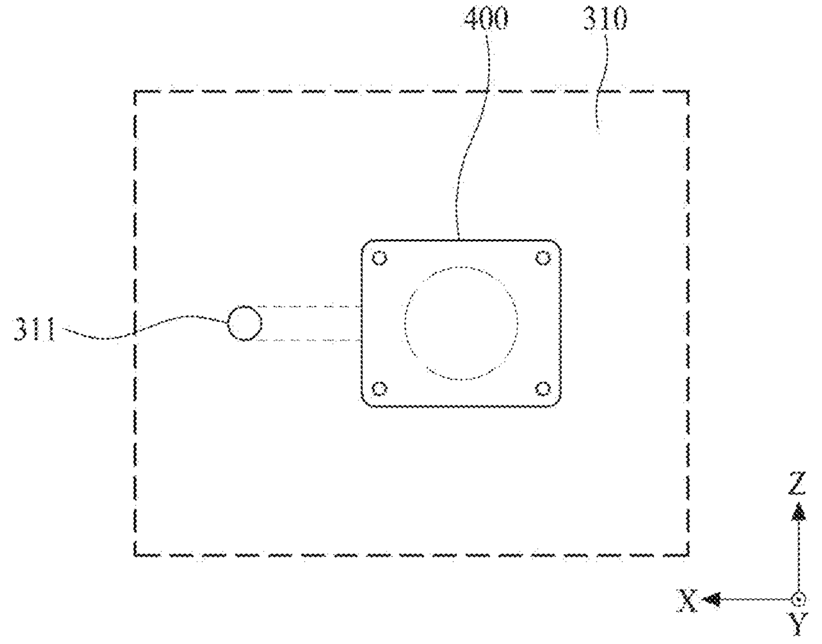
FIG. 10 illustrates a Helmholtz resonator in a display apparatus according to an embodiment of the present disclosure.

FIG. 10 illustrates a Helmholtz resonator in a display apparatus according to an embodiment of the present disclosure.

A resonance frequency of the Helmholtz resonator may be expressed by the following Equation (1).

$$f = \frac{c}{2\pi}\sqrt{\frac{A}{Vl}}$$ [Equation 1]

In Equation (1), ‘f’ denotes a resonance frequency, ‘A’ denotes a cross-sectional area of an opening or a hole portion of the Helmholtz resonator, ‘l’ denotes a length of the opening or the hole portion of the Helmholtz resonator, ‘V’ denotes a volume of the Helmholtz resonator, and ‘c’ denotes a sound wave velocity (when a temperature is 15° C., ‘c’ is 340 m/sec, and when a temperature increases by 1° C., ‘c’ increases by 0.6 m)

In FIG. 10, a dimension of the rear cover part 310 corresponding to the first vibration generating module 400 or an effective area of the rear cover part 310 excited by the first vibration generating module 400 may be set as a dimension, and the volume ‘V’ of the Helmholtz resonator may be calculated by multiplying the set dimension by a certain height. For example, when an area corresponding to the first vibration generating module 400 and the rear cover part 310 excited by the first vibration generating module 400 is 64 mm×47 mm, a maximum displacement based on excitation of the first vibration generating module 400 is 1.2 mm, a thickness of the rear cover part 310 is 0.8 mm, and an effective air gap between the rear cover part 310 and a structure (a backlight unit) disposed on the rear cover part 310 is 0.5 mm, a height of the Helmholtz resonator may be adjusted to 2.5 mm (1.2 mm+0.8 mm+0.5 mm), which is a sum thereof.

Therefore, the volume 'V' of the Helmholtz resonator may be calculated by multiplying an excited area of the first vibration generating module 400 by the calculated height of the Helmholtz resonator. And then, the rear cover hole 311, which communicates with the effective air gap, is spaced apart from the first vibration generating module 400, and has a certain size, is provided in the rear cover part 310. A distance by which the rear cover hole 311 is spaced apart from the first vibration generating module 400 may be a length 'l' of the opening or the hole portion of the Helmholtz resonator, and a cross-sectional area of the rear cover hole 311 may be an area 'A' of the opening or the hole portion of the Helmholtz resonator.

As in Equation (1), the resonance frequency 'f' of the Helmholtz resonator may be proportional to the cross-sectional area 'A' of the hole portion of the rear cover hole 311. For example, as the cross-sectional area 'A' of the hole portion of the rear cover hole 311 becomes narrower, the resonance frequency 'f' of the Helmholtz resonator may be low, and as the volume 'V' of the Helmholtz resonator increases and the length 'l' of the hole portion of the rear cover hole 311 increases, the resonance frequency 'f' of the Helmholtz resonator may be low.

With reference to Equation (1) and FIG. 9, when the display apparatus according to an embodiment of the present disclosure includes the Helmholtz resonator configured by the first vibration generating module 311, the rear cover part 310, and the rear cover part first hole 400, a sound vibration noise of a frequency of a selected low-pitched sound area may be reduced and possibly minimized by adjusting a distance between the rear cover hole 311 and the first vibration generating module 400 or the length 'l' and cross-sectional area 'A' of the hole portion of the rear cover hole 311 corresponding to the Helmholtz resonator and a volume 'V' of the Helmholtz resonator.

Moreover, a friction loss of flow caused by an air duct resistance may be calculated as expressed in the following Equation (2).

$$\Delta p=(0.109136q^{1.9})/d_e^{5.02} \qquad \text{[Equation 2]}$$

In Equation (2), Δp denotes a frictional force of an air duct (an opening), d denotes a diameter of an air duct (an opening), and q denotes air flow. As in Equation (2), due to introduction of the air duct (the opening) having a certain size, it may be seen that, as air flow increases, the frictional force increases, and as the diameter of the air duct (the opening) increases, the frictional force decreases.

With reference to Equations (1) and (2), common factors thereof are the area 'A' of the opening or the hole portion of the Helmholtz resonator corresponding to the rear cover hole 311 and the diameter 'd' of the opening or the hole portion of the air duct. Also, Equation (1) includes the distance 'l' by which the rear cover hole 311 is spaced apart from the first vibration generating module 400, and which is a dependent adjustment factor in Equation (2). Therefore, the air duct may reduce and possibly minimize friction loss caused by the opening or the hole portion, and may amplify or attenuate a sound pressure of a frequency that is adjusted using the Helmholtz resonator.

Therefore, the display apparatus according to an embodiment of the present disclosure may output, to the forward region FD in front of the display panel 110, the sound S1 of the first sound band generated based on the vibration of the center portion CP of the display module 100 (or the display panel) caused by a vibration of the first vibration generating module 400, and the sound S2 of the second sound band generated based on a vibration of the periphery portion EP of the display panel 110 (or the display panel) caused by a vibration of the second vibration generating module 500. Thus, the display apparatus may provide a more accurate sound to a listener, thereby enhancing an immersion experience of the listener (or a viewer) due to harmony (or matching) between an image and a sound.

Moreover, the display apparatus according to an embodiment of the present disclosure may output the sound S1 of the first sound band by using the first vibration generating module 400 having a voice coil type having a relatively good low-pitched sound output characteristic, and may output the sound S2 of the second sound band by using the second vibration generating module 500 including a piezoelectric element having a piezoelectric effect and having a relatively good low-pitched sound output characteristic, thereby outputting a sound of a broad sound band.

Moreover, the display apparatus according to an embodiment of the present disclosure may realize a stereo sound by using a left sound based on the first sound generating unit 410 and the first piezoelectric vibration unit 510 each disposed in the first center portion C1 and the first periphery portion EP1 of the display module 100, and a right sound based on the second sound generating unit 430 and the second piezoelectric vibration unit 530 each disposed in the second center portion C2 and the second periphery portion EP2 of the display module 100.

Moreover, in the display apparatus according to an embodiment of the present disclosure, a sound wave based on a vibration of each of the first and second vibration generating modules 400 and 500 may be directly transferred (or propagated) to the display module 100 through the first and second holes 313 and 315, which are provided in the rear cover part 310 of the rear cover 300 to overlap each of the first and second vibration generating modules 400 and 500. Thus the sound pressure characteristic and sound quality of the sounds S1 and S3 may be further enhanced. Also, in the display apparatus according to an embodiment of the present disclosure, a noise characteristic of a low-pitched sound may be reduced by the Helmholtz resonator configured by the rear cover hole 311 in the rear cover 300.

Figure 11:
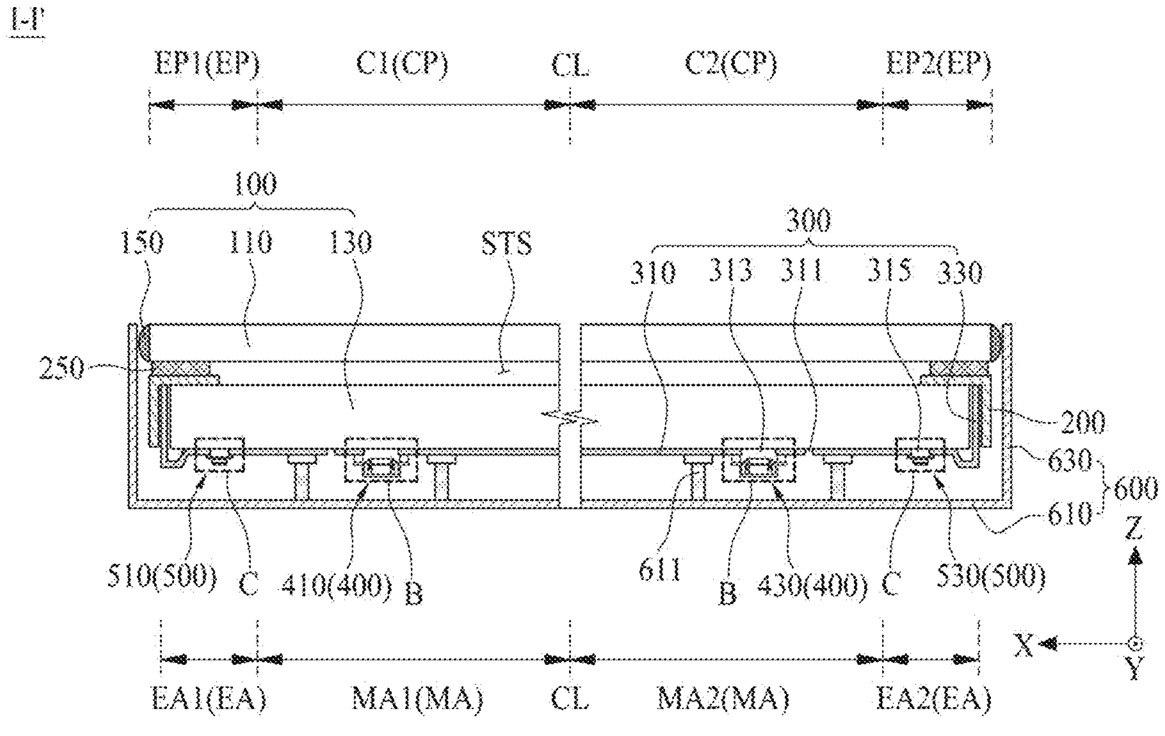
FIG. 11 is a cross-sectional view taken along line I-I' illustrated in FIG. 1 according to another embodiment of the present disclosure.
Figure 12:
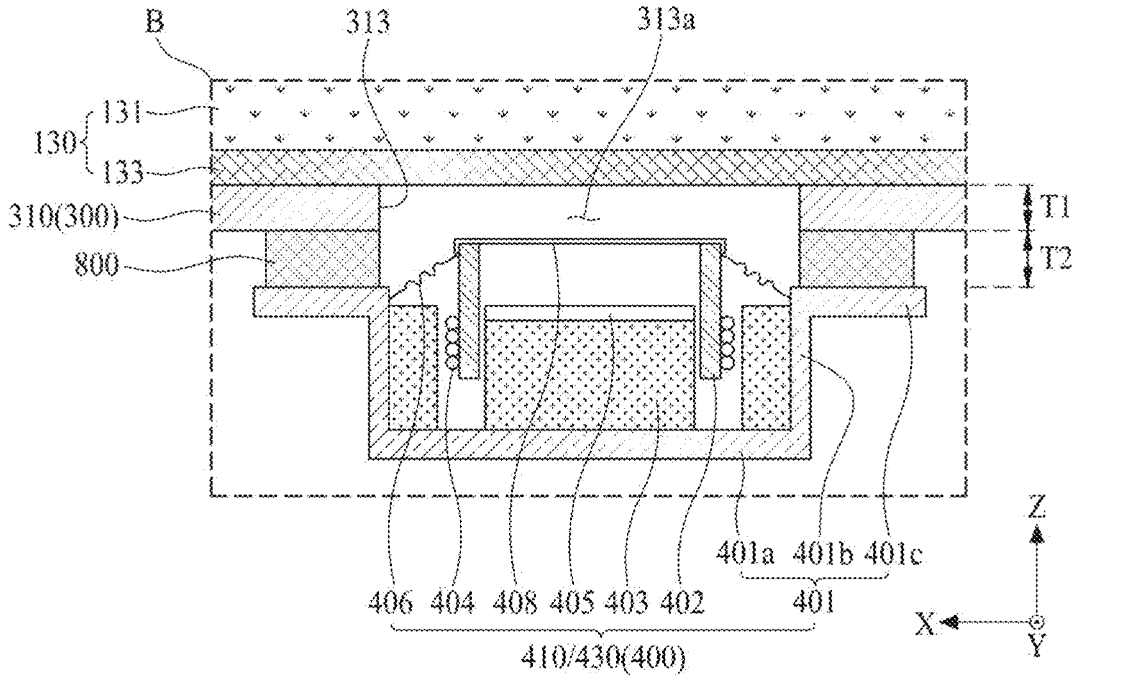
FIG. 12 is an enlarged view of a portion 'B' illustrated in FIG. 11.
Figure 13:
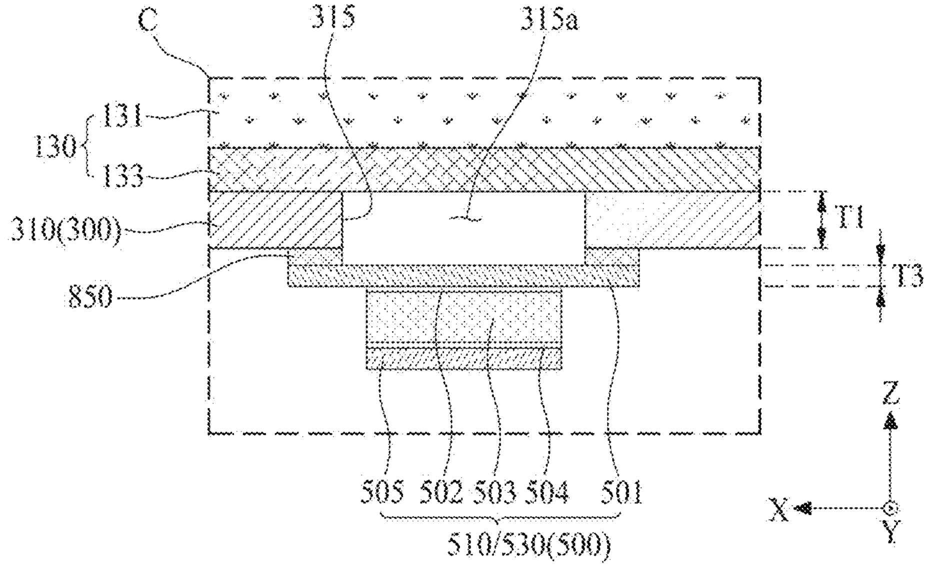
FIG. 13 is an enlarged view of a portion 'C' illustrated in FIG. 11.

FIG. 11 is another cross-sectional view taken along line I-I' illustrated in FIG. 1. FIG. 12 is an enlarged view of a portion 'B' illustrated in FIG. 11. FIG. 13 is an enlarged view of a portion 'C' illustrated in FIG. 11.

FIGS. 11 to 13 illustrate an embodiment implemented by modifying the first and second vibration generating modules of the display apparatus illustrated in FIG. 3. Hereinafter, therefore, only first and second vibration generating modules will be described in detail, and in the other elements, like reference numerals refer to like elements, and repetitive descriptions may be omitted or will be briefly given.

With reference to FIGS. 11 and 12, in conjunction with FIG. 1, a first vibration generating module 400 according to another embodiment of the present disclosure may include a first sound generating unit 410 and a second sound generating unit 430.

Each of the first and second sound generating units 410 and 430 may be supported by a rear cover part 310 of a rear cover 300 to cover a first hole 313 in the rear cover part 310. Each of the first and second sound generating units 410 and 430 may vibrate based on a sound signal to vibrate a center portion CP of a display module 100, thereby generating a first sound S1 in the center portion CP of the display module 100. For example, each of the first and second sound generating units 410 and 430 may vibrate based on the sound signal to generate a sound wave, the sound wave may pass through the first hole 313, and may be propagated (or transferred) to the display module 100, and the center portion CP of the display module 100 may vibrate based on the sound wave transferred through the first hole 313, whereby the first sound S1 generated in the center portion CP of the display module 100 may be output to a forward region FD in front of the display module 100.

According to an embodiment, the first hole 313 may act as a sound wave propagation path (or a sound energy input portion) through which a sound wave (or a sound) or sound energy generated based on the vibration of each of the first and second sound generating units 410 and 430 is directly propagated (or input) to a rear surface of the display module 100.

According to the present embodiment, each of the first and second sound generating units 410 and 430 may independently vibrate without vibrating the rear cover part 310, and thus, may directly vibrate the center portion CP of the display module 100 even without using the rear cover part 310 as a vibration plate, and may reduce and possibly minimize a vibration of the rear cover part 310 to generate a stable sound wave, thereby reducing and possibly minimizing noise caused by the vibration of the rear cover part 310.

Each of the first and second sound generating units 410 and 430 according to an embodiment may include a module frame 401, a bobbin 402, a magnet member 403, a coil 404, a center pole 405, and a damper 406. In an example, in each of the first and second sound generating units 410 and 430, the module frame 401 may be referred to as a “fixing part” fixed to the rear cover 300, and each of the bobbin 402, the magnet member 403, the coil 404, the center pole 405, and the damper 406 may be referred to as a “vibration part” for vibrating the display module 100. However, the present embodiment is not limited thereto.

The module frame 401 may be supported by the rear cover part 310. The module frame 401 according to an embodiment may include a frame body 401*a*, an upper plate 401*b*, and a fixing bracket 401*c*. The frame body 401*a* may be fixed to the rear cover part 310. The frame body 401*a* may act as a lower plate that supports the magnet member 403.

The upper plate 401*b* may protrude to a front periphery of the frame body 401*a* to have a cylindrical shape including a hollow portion. Therefore, the frame body 401*a* and the upper plate 401*b* may be provided as one body having a U-shape. The frame body 401*a* and the upper plate 401*b* are not limited to the terms, and may each be referred to as a “yoke.” The frame body 401*a* and the upper plate 401*b* may each have a size corresponding to the first hole 313 in the rear cover part 310 of the rear cover 300.

The fixing bracket 401*c* may protrude from a side surface of the upper plate 401*b*. The fixing bracket 401*c* may be fixed to the rear cover part 310 by a second connection member 800. Thus, the module frame 401 may be fixed to the rear cover part 310.

The bobbin 402 may be on the module frame 401 in order for a portion of an uppermost portion thereof to be inserted or accommodated into the first hole 313. Except for that the bobbin 402 vibrates based on a magnetic force in a region 313*a* overlapping the first hole 313 of the rear cover part 310, and for example, performs a vertical reciprocating motion to generate a sound wave in the region 313*a* overlapping the first hole 313 of the rear cover part 310, the bobbin 402 may be substantially the same as the bobbin illustrated in FIG. 6, and thus, repetitive description may be omitted.

The magnet member 403 may be provided on the module frame 401 to be accommodated into the hollow portion 402*a* of the bobbin 402. The coil 404 may be wound to surround a lower outer circumference surface of the bobbin 402, and may be supplied with the sound signal (or a voice signal) from the outside. The center pole 405 may be disposed on the magnet member 403 to guide a vibration of the bobbin 402. The damper 406 may be disposed between the module frame 401 and the bobbin 402. Except for that each of the bobbin 402, the magnet member 403, the coil 404, the center pole 405, and the damper 406 is disposed to overlap only the first hole 313 without overlapping the rear cover part 310, the bobbin 402, the magnet member 403, the coil 404, the center pole 405, and the damper 406 may be substantially the same as the bobbin, the magnet member, the coil, the center pole, and the damper each illustrated in FIG. 6. Thus, repetitive descriptions may be omitted.

The second connection member 800 may be disposed between the rear cover part 310 near the first hole 313 and the fixing bracket 401*c* of the module frame 401, and may couple or fix the first and second sound generating units 410 and 430 to the rear cover part 300. The second connection member 800 may include a double-sided tape or a double-sided foam tape each having an adhesive layer. The adhesive layer of the second connection member 800 may include an acryl-based adhesive material or a urethane-based adhesive material. In an example, the adhesive layer of the second connection member 800 may include the urethane-based adhesive material having a relatively ductile characteristic, rather than the acryl-based adhesive material having a characteristic that is relatively high in hardness, for reducing and possibly minimizing a degree to which a vibration of each of the first and second sound generating units 410 and 430 is transferred to the rear cover part 310, but is not limited thereto.

The second connection member 800 according to an embodiment may have a second thickness T2 that is thicker than a first thickness T1 of the rear cover 300 (for example, a first thickness T1 of the rear cover part 310). The second thickness T2 of the second connection member 800 according to an embodiment may be one to four times the first thickness T1 of the rear cover part 310. In an example, when the second thickness T2 of the second connection member 800 is less than a thickness that is one times the first thickness T1 (e.g., the same thickness) of the rear cover part 310, a distance (or an interval) between a rearmost surface of the display module 100 and the bobbin 402 may be relatively short, and thus, the bobbin 402 that vibrates in a thickness direction Z of the display module 100 may pass through the first hole 313, and may physically contact the rearmost surface of the display module 100, whereby the bobbin 402 may be damaged. On the other hand, when the second thickness T2 of the second connection member 800 is greater than a thickness that is four times the first thickness T1 of the rear cover part 310, the distance (or the interval) between the rearmost surface of the display module 100 and the bobbin 402 may be relatively long, and thus, the loss of a sound wave of the high-pitched sound band proportional to the distance may increase, whereby a sound of the middle-high-pitched sound band may not be realized or a sound wave of the middle-high-pitched sound band may be reduced. Due to this, a sound of the middle-high-pitched sound band generated by the first vibration generating module 400 and a sound of a middle-low-pitched pitched sound band generated by the second vibration generating module 500 may be separated from each other. Therefore, the bobbin 402 may stably vibrate in the first hole 313 without physically contacting the rearmost surface of the display module 100, and to realize the sound of the middle-high-pitched sound band and generate a sound wave of the middle-high-pitched sound band, the second thickness T2 of the second connection member 800 may be adjusted to a thickness that is one to four times the first thickness T1 of the rear cover part 310.

Each of the first and second sound generating units 410 and 430 according to an embodiment may further include a bobbin protection member 408 on the bobbin 402. The bobbin protection member 408 may be provided in a cylindrical structure including an opening that overlaps a hollow portion 402*a* of the bobbin 402, and may be coupled to an upper surface of the bobbin 402. The bobbin protection member 408 according to an embodiment may cover the upper surface of the bobbin 402 to protect the bobbin 402, thereby preventing deformation of the bobbin 402 caused by an external impact.

According to another embodiment, the bobbin protection member 408 may be provided in a plate structure covering the whole upper surface and the hollow portion 402*a* of the bobbin 402, and may be coupled to the upper surface of the bobbin 402. The bobbin protection member 408 according to another embodiment may cover the whole upper surface of the bobbin 402 to protect the bobbin 402, and thus, may prevent deformation of the bobbin 402 caused by an external impact. The bobbin protection member 408 according to another embodiment may be disposed in a plate structure on the bobbin 402, and may increase a sound wave generated based on a vibration of the bobbin 402.

Each of the first and second sound generating units 410 and 430 according to an embodiment may independently vibrate without using the rear cover part 310 as a vibration plate, and thus, may generate a sound wave (or a sound) that passes through the first hole 313 and directly vibrates the display module 100, and may also reduce and possibly minimize a vibration of the rear cover part 310 to generate a stable sound wave, thereby reducing and possibly minimizing noise caused by the vibration of the rear cover part 310.

With reference to FIGS. 11 and 13 in conjunction with FIG. 1, a second vibration generating module 500 according to another embodiment of the present disclosure may include a first piezoelectric vibration unit 510 and a second piezoelectric vibration unit 530.

Each of the first and second piezoelectric vibration units 510 and 530 may be supported by the rear cover part 310 of the rear cover 300 to cover a second hole 315 in the rear cover part 310. Each of the first and second piezoelectric vibration units 510 and 530 may vibrate based on the sound signal to vibrate a periphery portion EP of the display module 100, thereby generating a second sound S2 in the periphery portion EP of the display module 100. For example, each of the first and second piezoelectric vibration units 510 and 530 may vibrate based on the sound signal to generate a sound wave, the sound wave may pass through the second hole 315, and may be propagated (or transferred) to the display module 100, and the periphery portion EP of the display module 100 may vibrate based on the sound wave transferred through the second hole 315, whereby the second sound S2 generated in the periphery portion EP of the display module 100 may be output to the forward region FD in front of the display module 100.

According to the embodiment, the second hole 315 may act as a sound wave propagation path (or a sound energy input portion) through which a sound wave (or a sound) or sound energy generated based on the vibration of each of the first and second piezoelectric vibration units 510 and 530 is directly propagated (or input) to the rear surface of the display module 100.

According to the embodiment, each of the first and second piezoelectric vibration units 510 and 530 may independently vibrate without vibrating the rear cover part 310, and thus, may directly vibrate the periphery portion EP of the display module 100 even without using the rear cover part 310 as a vibration plate, and may reduce and possibly minimize a vibration of the rear cover part 310 to generate a stable sound wave, thereby reducing and possibly minimizing noise caused by the vibration of the rear cover part 310.

Each of the first and second piezoelectric vibration units 510 and 530 according to an embodiment may include a base plate 501 and a piezoelectric element 503. The base plate 501 may be coupled to the rear cover part 310 of the rear cover 300 by a third adhesive member 850, and may cover the second hole 315 in the rear cover part 310. In an example, the base plate 501 may have a size that is greater than that of the second hole 315.

The base plate 501 may be used as a vibration plate that generates a sound pressure in the second hole 315. The base plate 501 according to an embodiment may be formed of one metal material of stainless steel, aluminum (Al), a magnesium (Mg) alloy, a Mg-lithium (Li) alloy, and an Al alloy, but is not limited thereto. In an example, the base plate 501 may have a third thickness T3 that is thinner than the first thickness T1 of the rear cover part 301, for generating a sound of the middle-high-pitched sound band. When the third thickness T3 of the base plate 501 is thicker than the first thickness T1 of the rear cover part 310, a vibration of the piezoelectric element 503 may be difficult to propagate to the inside of the second hole 315. The base plate 501 may vibrate based on a vibration of the piezoelectric element 503 to generate a sound (or a sound wave) of the middle-high-pitched sound band of 3 kHz or more, and the generated sound may be propagated to the inside of the second hole 315.

The third adhesive member 850 may be between the base plate 501 and the rear cover part 310 near the second hole 315, and may couple or fix the first and second piezoelectric vibration units 510 and 530 to the rear cover part 300. The third adhesive member 850 may include a double-sided tape or a double-sided foam tape each having an adhesive layer. The adhesive layer of the third adhesive member 850 according to an embodiment may include an acryl-based adhesive material or a urethane-based adhesive material. In an example, the adhesive layer of the third adhesive member 850 may include the urethane-based adhesive material having a relatively ductile characteristic, rather than the acryl-based adhesive material having a characteristic that is relatively high in hardness, for reducing and possibly minimizing a degree to which a vibration of each of the first and second piezoelectric vibration units 510 and 530 is transferred to the rear cover part 310, but is not limited thereto.

The piezoelectric element 503 may be disposed in the base plate 501 to vibrate the base plate 501. The piezoelectric element 503 may be disposed on a rear surface of the base plate 501 to overlap the second hole 315 of the rear cover part 310. In an example, the piezoelectric element 503 may be coupled to the base plate 501 by a third connection member 502.

The piezoelectric element 503 may include a piezoelectric material layer having a piezoelectric effect. The piezoelectric element 503 may have a configuration (or a structure) that is substantially the same as the piezoelectric element 511 or the second piezoelectric element 531 each illustrated in FIG. 4, and thus, repetitive description may be omitted.

The piezoelectric element 503 may have a size that is less than that of the second hole 315 of the rear cover part 310, to be disposed in a region 315*a* overlapping the second hole 315. In an example, a median center portion of the piezoelectric element 503 may be disposed in the median center portion of the second hole 315. A center portion of the piezoelectric element 503 may be disposed in a center portion of the second hole 315.

The third connection member 502 may include a double-sided tape or a naturally curable adhesive. The third connection member 502 may include a thermocurable adhesive or a photocurable adhesive, and for example, a characteristic of the piezoelectric element 503 may be reduced by heat used in a curing process of curing the third connection member 502.

Each of the first and second piezoelectric vibration units 510 and 530 according to an embodiment may further include a cover plate 505. The cover plate 505 may be coupled or connected to the piezoelectric element 503 by a fourth connection member 504. The cover plate 505 may cover a rear surface of the piezoelectric element 503 to protect the piezoelectric element 503. Also, the cover plate 505 may reinforce a mass of each of the first and second piezoelectric vibration units 510 and 530, and may decrease a resonance frequency of each of the first and second piezoelectric vibration units 510 and 530 based on the increase in mass, thereby increasing a sound wave characteristic of the low-pitched sound band of each of the first and second piezoelectric vibration units 510 and 530. The cover plate 505 according to an embodiment may have a material and a thickness that are the same as those of the base plate 501. However, the present embodiment is not limited thereto, and based on a sound characteristic needed for the first and second piezoelectric vibration units 510 and 530, the cover plate 505 may have a material and a thickness that differ from those of the base plate 501.

The fourth connection member 504 may include a double-sided tape or a naturally curable adhesive. The fourth connection member 504 may include a thermocurable adhesive or a photocurable adhesive, and for example, a characteristic of the piezoelectric element 503 may be reduced by heat used in a curing process of curing the fourth connection member 504.

Therefore, the display apparatus according to an embodiment may have the same effect as that of the display apparatus illustrated in FIGS. 2 to 4. Also, in the display apparatus according to an embodiment, the display module 100 may vibrate based on a sound wave that is generated based on driving of the first and second vibration generating modules 400 and 500 and passes through the second and third rear cover holes 313 and 315, and thus, may output the first and second sounds S1 and S2. Accordingly, without using the rear cover 300 as a vibration plate, the display apparatus according to an embodiment may output the first and second sounds S1 and S2 based on the vibration of the display module 100, and thus, the vibration of the rear cover part 310 may be reduced and possibly minimized, thereby preventing or reducing and possibly minimizing the occurrence of noise caused by the vibration of the rear cover part 310.

Figure 14:
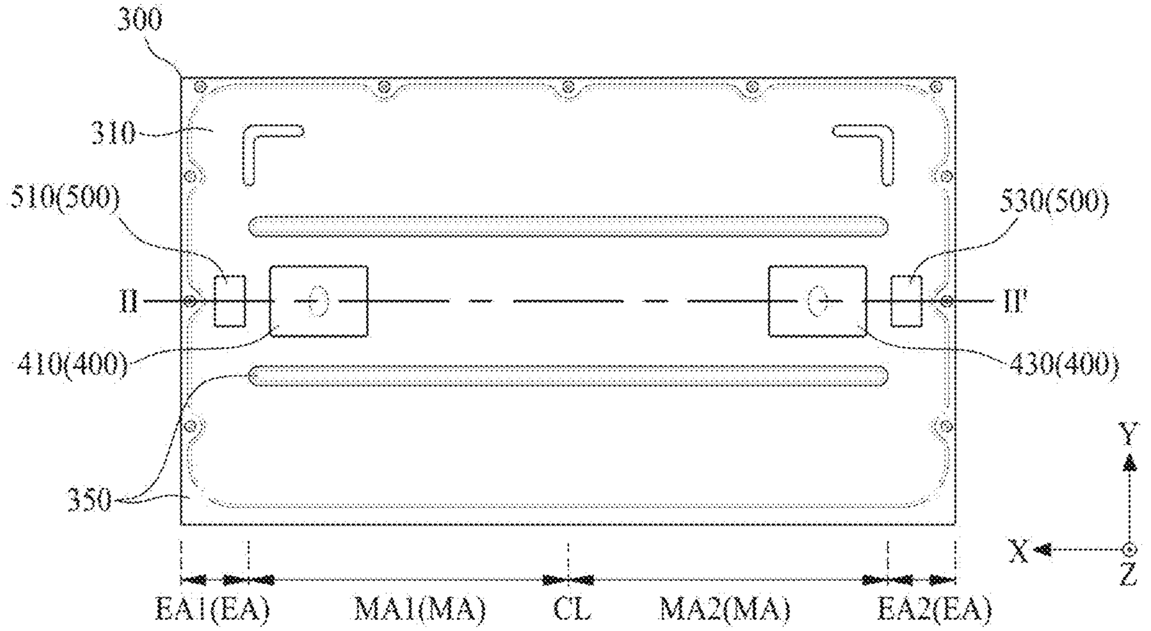
FIG. 14 illustrates a rear surface of a display apparatus according to another embodiment of the present disclosure.
Figure 15:
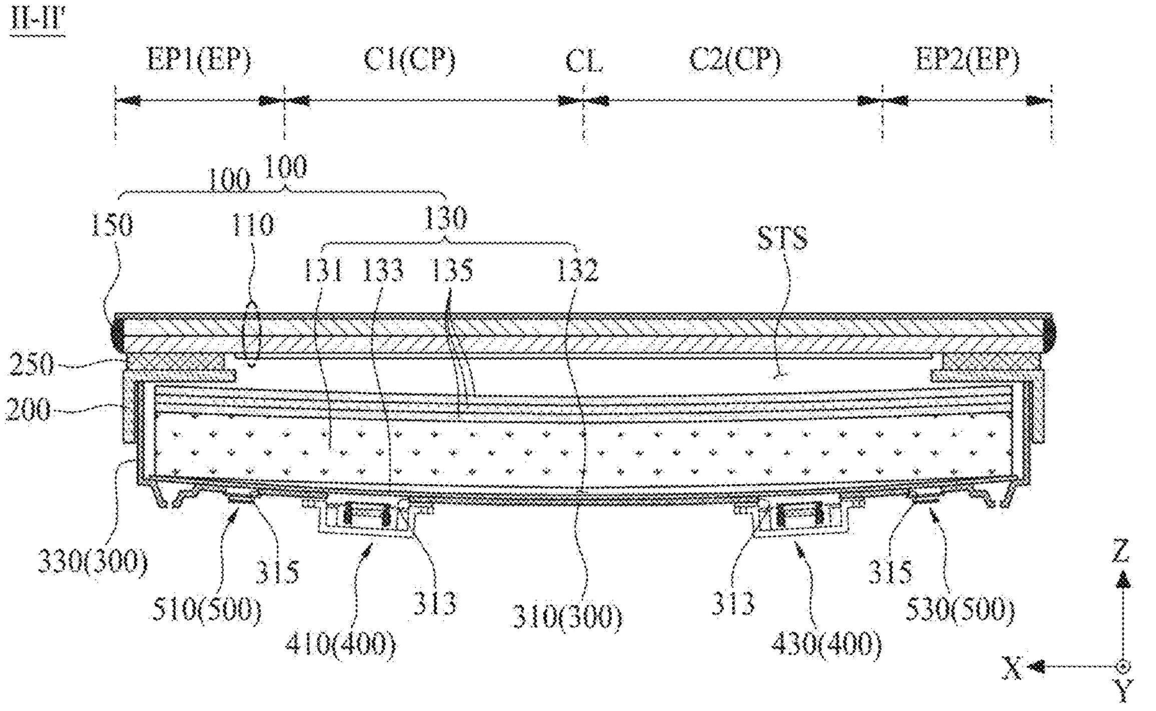
FIG. 15 is a cross-sectional view taken along line II-II" illustrated in FIG. 14.
Figure 16:
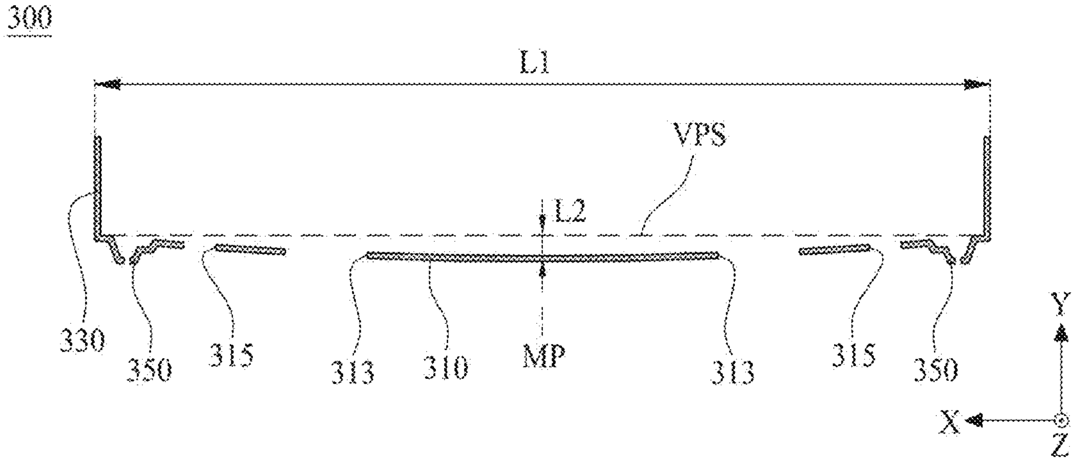
FIG. 16 is a cross-sectional view of a rear cover illustrated in FIG. 15.

FIG. 14 is a diagram illustrating a rear surface of a display apparatus according to another embodiment of the present disclosure, FIG. 15 is a cross-sectional view taken along line II-II' illustrated in FIG. 14, and FIG. 16 is a cross-sectional view of a rear cover illustrated in FIG. 15. FIGS. 14 to 16 illustrate an embodiment implemented by modifying a structure of the rear cover of the display apparatus illustrated in FIGS. 1 to 13. Hereinafter, therefore, only a rear cover, a backlight unit, and elements relevant thereto will be described in detail, and in the other elements, like reference numerals refer to like elements and repetitive descriptions may be omitted or will be briefly given.

With reference to FIGS. 14 to 16, in a display apparatus according to another embodiment of the present disclosure, a rear cover 300 may support a backlight unit 130 of a display module 100 so that an air gap 132 is provided in the backlight unit 130.

The rear cover 300 according to an embodiment may include a rear cover part 310 that supports a rear surface of the display module 100, and a side cover part 330 that is connected to and/or integral with a periphery of the rear cover part 310 to support the panel guide 200.

The rear cover part 310 may be disposed to cover the rear surface of the display module 100, and may support the display module 100. The rear cover part 310 may support the backlight unit 130 of the display module 100, and may support each of a first vibration generating module 400 and a second vibration generating module 500.

The rear cover part 310 may include a cross-sectional structure having a concavely curved shape so that an air gap 132 is provided in the backlight unit 130. The air gap 132 of the backlight unit 130 may act as a sound box for a sound that is generated based on a vibration of the first vibration generating module 400 and is propagated, thereby enhancing a sound characteristic of the low-pitched sound band. Except for the cross-sectional structure having a concavely curved shape, the rear cover part 310 may be substantially the same as the above-described rear cover part, and thus, a repetitive description of a structure other than the cross-sectional structure having a concavely curved shape may be omitted.

The rear cover part 310 according to an embodiment may have a cup structure in which a middle portion MP overlapping a center line CL of the display module 100 protrudes to a rear surface of the display apparatus, with respect to a first direction X (or a widthwise direction) of the display module 100. In an example, a distance (or an interval) between an upper surface of the rear cover part 310 and a rear surface of a display panel 110 may increase progressively in a direction from end portions EP1 and EP2 to the center line CL, with respect to the first direction X (or the widthwise direction) of the display module 100.

In the rear cover part 310 according to an embodiment, a distance L2 (or a depth) between a middle portion MP of the rear cover part 310 and a virtual planar surface VPS (or a horizontal line) connecting one end and the other end of the rear cover part 310 may be about 0.01% to 0.5% of a total length L1 of the rear cover part 310, with respect to a first direction X (or a widthwise direction) of the display module 100. In an example, when the depth L2 of the middle portion MP of the rear cover part 310 is about 0% of the total length L1 of the rear cover part 310, the rear cover part 310 may substantially have a plane structure, and for example, the air gap 132 may not be provided in the backlight unit 130. Also, when the depth L2 of the middle portion MP of the rear cover part 310 is more than about 0.5% of the total length L1 of the rear cover part 310, a distance (or a size) of the air gap 132 in the backlight unit 130 may increase, and thus, the loss of a sound wave of the high-pitched sound band proportional to the distance may increase, whereby a sound of the middle-high-pitched sound band may not be realized or a sound wave of the middle-high-pitched sound band may be reduced, a sound of the middle-high-pitched sound band generated by the first vibration generating module 400 and a sound of a middle-low-pitched sound band generated by the second vibration generating module 500 may be separated from each other, and a thickness of the display apparatus may increase. Accordingly, the depth L2 of the middle portion MP of the rear cover part 310 may be set to about 0.01% to 0.5% of the total length L1 of the rear cover part 310 so that the air gap 132 of the backlight unit 130 acts as a sound box for enhancing a sound characteristic of the low-pitched sound band.

A side cover part 330 may be bent from a periphery of the rear cover part 310, and may support a panel guide 200. The side cover part 330 may provide a backlight accommodating space in the rear cover part 310, and may surround side surfaces of the backlight unit 130 accommodated into (or supported by) the backlight accommodating space.

The rear cover 300 according to an embodiment may further include a reinforcement part 350. The reinforcement part 350 may reinforce a stiffness of the rear cover 300, and thus may be referred to as a "stiffness reinforcement" part, but is not limited thereto.

The reinforcement part 350 may protrude by a certain height from the rear cover part 310, and may reinforce a stiffness of the rear cover 300.

The reinforcement part 350 according to an embodiment may include a periphery reinforcement part provided along a periphery of the rear cover part 310 and a plurality of center reinforcement parts that are provided in a center cover region of the rear cover part 310 in parallel with the first direction X. The plurality of center reinforcement parts may be disposed in parallel with the first and second vibration generating modules 400 and 500 therebetween.

The backlight unit 130 may include a reflective sheet 133, a light guide plate 131, a light source unit, and an optical sheet part 135.

The reflective sheet 133 may be disposed on the rear cover part 310 of the rear cover 300. The reflective sheet 133 may be disposed on the rear cover part 310 to have a concave shape along a concave shape of the rear cover part 310. In an example, the reflective sheet 133 may be bent in a concave shape by a self-weight thereof, and thus, may be disposed in the rear cover part 310 to have a conformal shape that is based on a shape of the rear cover part 310. The reflective sheet 133 may reflect light, which is incident from the light guide plate 131, to the light guide plate 131 to reduce and possibly minimize the loss of light.

The light guide plate 131 may include a light incident surface that is disposed on the reflective sheet 133 to overlap the display panel 110 and is provided on at least one sidewall thereof. The light guide plate 131 may include a light-transmitting plastic or glass material. The light guide plate 131 may allow light, which is incident through the light incident surface from the light source unit, to travel to the display panel 110.

The light guide plate 131 may be disposed on the reflective sheet 133 to have a concave shape that is not based on a concave shape of the rear cover part 310. For example, the light guide plate 131 may be disposed on the reflective sheet 133 to have a non-conformal shape that is not based on a shape of the reflective sheet 133 (or the rear cover part 310). Therefore, the backlight unit 130 may include an air gap 132 between the reflective sheet 133 and the light guide plate 131. The air gap 132 may be provided between the light guide plate 131 and the reflective sheet 133 overlapping a center portion CP of the display module 100. The reflective sheet 133 overlapping a periphery portion EP of the display module 100 may contact a periphery of the light guide plate 131, and thus, the air gap 132 may not be provided between the reflective sheet 133 and the periphery of the light guide plate 131. The air gap 132 may be provided between the light guide plate 131 and the reflective sheet 133 overlapping the center portion CP of the display module 100. Thus, the air gap 132 may act as a sound box for a sound that is generated based on a vibration of the first vibration generating module 400 and is propagated, thereby enhancing a sound characteristic of the low-pitched sound band.

The light guide plate 131 may be bent in a concave shape by a self-weight thereof, and may be disposed on the reflective sheet 133. In an example, when a stiffness of the light guide plate 131 is relatively low, the light guide plate 131 may be bent in a shape that is based on a concave shape of the rear cover part 310, and may be disposed on the reflective sheet 133. Thus, the air gap 132 may not be provided between the reflective sheet 133 and the light guide plate 131. On the other hand, when a stiffness of the light guide plate 131 is relatively high, the light guide plate 131 may not be bent by the self-weight thereof, and may be disposed on the reflective sheet 133 in a planar state. Thus, the air gap 132 may be provided between portions other than both ends of the reflective sheet 133 and the light guide plate 131. In an example, a distance (or a size) of the air gap 132 may increase, and thus, the loss of a sound wave of the high-pitched sound band proportional to the distance may increase, whereby a sound of the middle-high-pitched sound band may not be realized or a sound wave of the middle-high sound band may be reduced, and a sound of the middle-high-pitched sound band generated by the first vibration generating module 400 and a sound of a middle-low-pitched sound band generated by the second vibration generating module 500 may be separated from each other. Accordingly, the light guide plate 131 may be formed of a stiff material that is bent in a non-conformal shape that is not based on a concave shape of the reflective sheet 133 (or the rear cover part 310) and is disposed on the reflective sheet 133, for providing the air gap 132 between the light guide plate 131 and the reflective sheet 133 overlapping the center portion CP of the display module 100.

The light source unit may irradiate light onto the light incident surface in the light guide plate 131. The light source unit may be disposed in the rear cover 300 to overlap a first periphery of the display panel 110. The light source unit according to an embodiment may include a plurality of light-emitting diodes (LEDs) that are mounted on a printed circuit board (PCB) for a light source and irradiate lights onto the light incident surface.

The optical sheet part 135 may be on a front surface of the light guide plate 131, and may enhance a luminance characteristic of light output from the light guide plate 131. The optical sheet part 135 may be disposed on the light guide plate 131 to have a conformal shape that is based on a concave shape of the light guide plate 131.

Therefore, the display apparatus according to an embodiment may have the same effect as that of the display apparatus illustrated in FIGS. 11 to 13. Also, in the display apparatus according to the present embodiment, the air gap 132 provided between the reflective sheet 133 and the light guide plate 131 of the backlight unit 130 may act as a sound box by using the rear cover part 310 of the rear cover 300 having a cross-sectional structure with a concavely curved shape, thereby further enhancing a sound characteristic of the low-pitched sound band.

FIGS. 17A to 17G illustrate various disposition structures of first and second vibration generating modules in a display apparatus according to another embodiment of the present disclosure and illustrate an embodiment implemented by modifying a disposition structure of the first and second vibration generating modules of the display apparatus illustrated in FIGS. 1 to 16. Hereinafter, therefore, a configuration and a structure other than the disposition structure of first and second vibration generating modules may be the same as the above description, and thus, repetitive descriptions may be omitted.

Figure 17A:
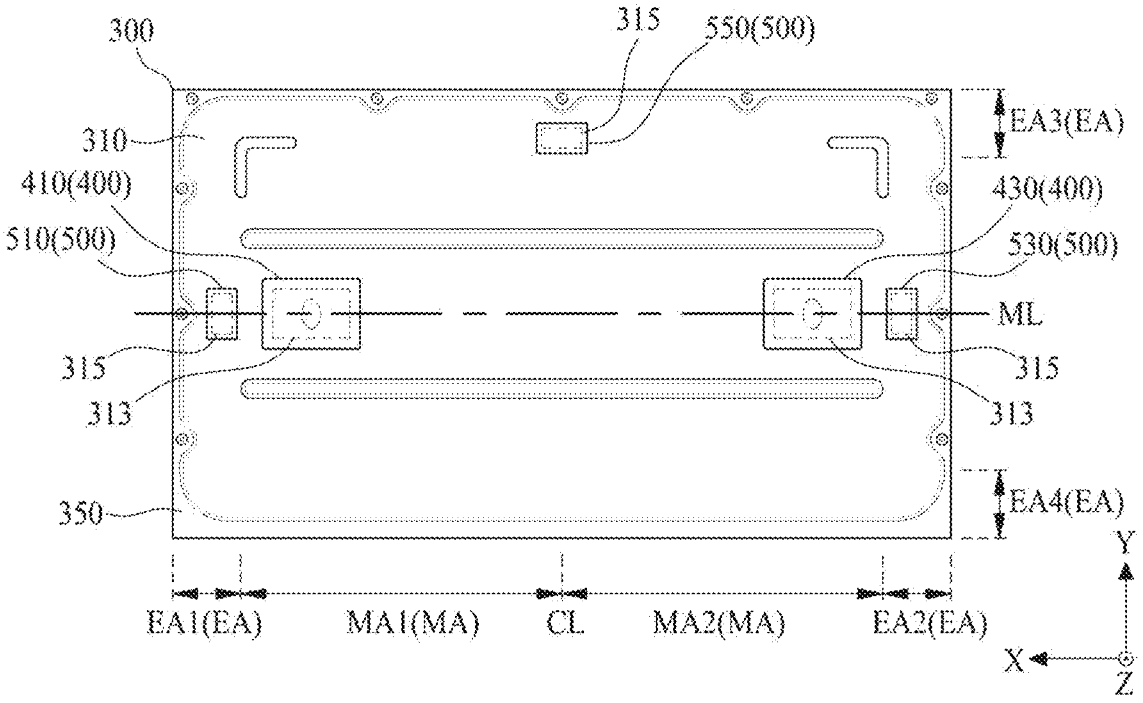
FIGS. 17A to 17G illustrate disposition structures of first and second vibration generating modules in a display apparatus according to another embodiment of the present disclosure.
Figure 17B:
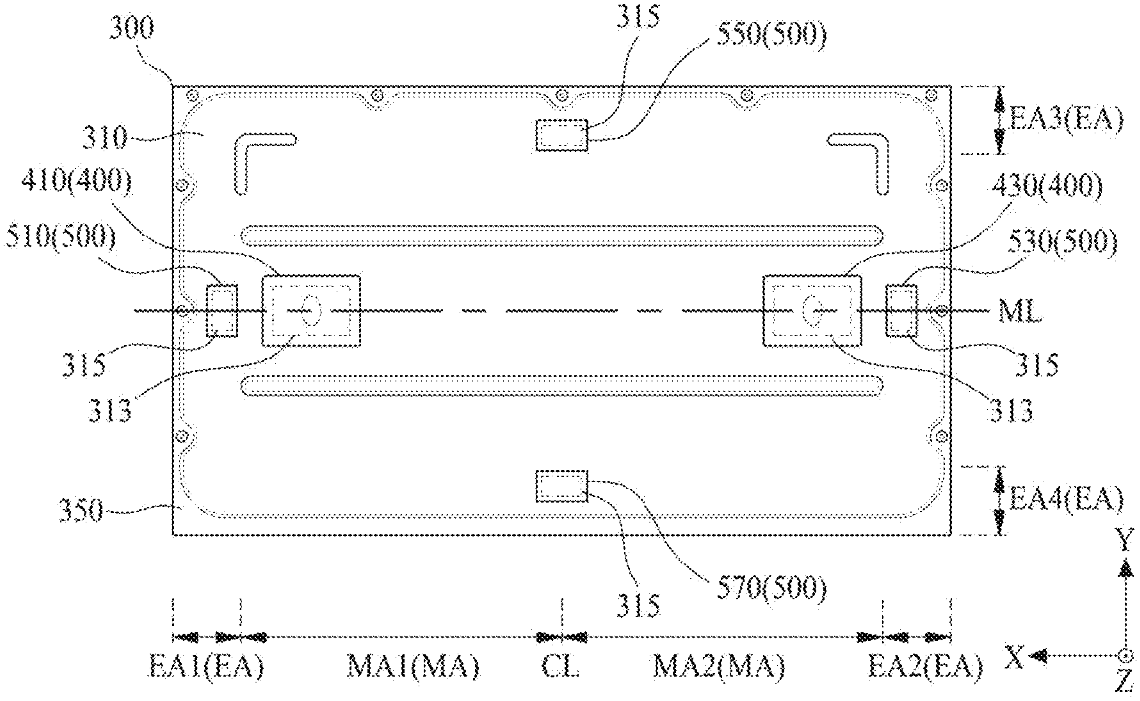
Figure 17C:
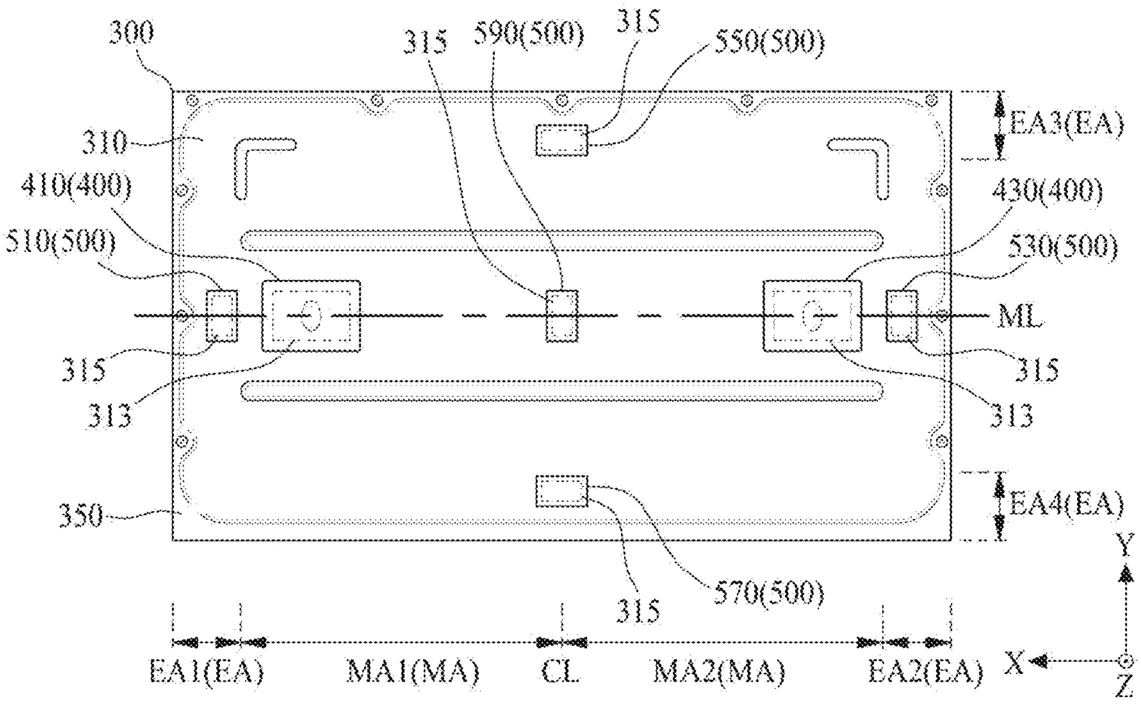

With reference to FIGS. 17A to 17C, in a display apparatus according to an embodiment of the present disclosure, a first vibration generating module 400 may include first and second sound generating units 410 and 430 respectively disposed in first and second periphery regions EA1 and EA2 of a rear cover part 310 with respect to a first direction X, and may be substantially the same as the first vibration generating module 400 of the display apparatus illustrated in FIGS. 1 to 16, and thus, repetitive description may be omitted.

In the display apparatus according to an embodiment of the present disclosure, a second vibration generating module 500 may include at least three piezoelectric vibration units 510, 530, 550, 570, and 590 respectively disposed in at least three portions among first to fourth periphery regions EA1 to EA4 and a median center region (or a center region) of the rear cover part 310. The first to fourth periphery regions EA1 to EA4 of the rear cover part 310 may respectively correspond to or overlap first to fourth periphery portions of a display module.

In an example, as illustrated in FIG. 17A, a second vibration generating module 500 may include first to third piezoelectric vibration units 510, 530, and 550 respectively disposed in center portions of first to third periphery regions EA1 to EA3 of the rear cover part 310. The first to third piezoelectric vibration units 510, 530, and 550 may respectively correspond to or overlap the first to third periphery portions of the display module. In an example, the rear cover part 310 may include three second holes 315 that are respectively in the first to third periphery regions EA1 to EA3 to respectively overlap the first to third piezoelectric vibration units 510, 530, and 550. Therefore, the display apparatus illustrated in FIG. 17A may have the same effect as that of the display apparatus illustrated in FIGS. 1 to 16, and because the third piezoelectric vibration unit 550 is added, a three-dimensional effect of a sound may increase based on sounds that are output from a left portion, a right portion, and an upper portion of the display module, whereby the display apparatus according to an embodiment may have a five-channel sound output characteristic. The display apparatus according to an embodiment may be suitable for a monitor of a personal gaming computer, but is not limited thereto.

As another example, as illustrated in FIG. 17B, a second vibration generating module 500 may include first to fourth piezoelectric vibration units 510, 530, 550, and 570 respectively disposed in center portions of first to fourth periphery regions EA1 to EA4 of a rear cover part 310. The first to fourth piezoelectric vibration units 510, 530, 550, and 570 may respectively correspond to or overlap the first to fourth periphery portions of a display module. In an example, the rear cover part 310 may include four second holes 315 that are respectively provided in the first to fourth periphery regions EA1 to EA4 to respectively overlap the first to fourth piezoelectric vibration units 510, 530, 550, and 570. Therefore, the display apparatus illustrated in FIG. 17B may have the same effect as that of the display apparatus illustrated in FIGS. 1 to 16, and because the third and fourth piezoelectric vibration units 550 and 570 are added, a three-dimensional effect of a sound may more increase based on sounds that are output from a left portion, a right portion, an upper portion, and a lower portion of the display module, whereby the display apparatus according to an embodiment may have a six-channel sound output characteristic. The display apparatus according to an embodiment may be more suitable for a monitor of a personal gaming computer, but is not limited thereto.

As another example, as illustrated in FIG. 17C, a second vibration generating module 500 may include first to fourth piezoelectric vibration units 510, 530, 550, and 570, respectively disposed in center portions of first to fourth periphery regions EA1 to EA4 of a rear cover part 310, and a fifth piezoelectric vibration unit 590 in a median center region (or a center region) of the rear cover part 310. The first to fourth piezoelectric vibration units 510, 530, 550, and 570 may respectively correspond to or overlap the first to fourth periphery portions of a display module, and the fifth piezoelectric vibration unit 590 may correspond to or overlap a median center portion (or a center portion) of the display module. In an example, the rear cover part 310 may include five second holes 315 that are respectively provided in the first to fourth periphery regions EA1 to EA4 and the center portion of the display module to respectively overlap the first to fifth piezoelectric vibration units 510, 530, 550, 570, and 590. Therefore, the display apparatus illustrated in FIG. 17C may have the same effect as that of the display apparatus illustrated in FIGS. 1 to 16, and because the third to fifth piezoelectric vibration units 550, 570, and 590 are added, a three-dimensional effect of a sound may further increase based on sounds that are output from a left portion, a right portion, an upper portion, a lower portion, and a median center portion (or a center portion) of the display module, whereby the display apparatus according to an embodiment may have a seven-channel sound output characteristic. The display apparatus according to an embodiment may be more suitable for a monitor of a personal gaming computer, but is not limited thereto.

As another example, in the display apparatus illustrated in FIG. 17C, the fifth piezoelectric vibration unit 590 disposed in a median center region (or a center region) of the rear cover part 310 may be replaced by a sound generating device, and for example, a sound characteristic of the low-pitched sound band may be enhanced based on an amplification effect of a sound of the low-pitched sound band generated by a sound generating unit disposed in the median center region (or a center region) of the rear cover part 310.

Figure 17D:
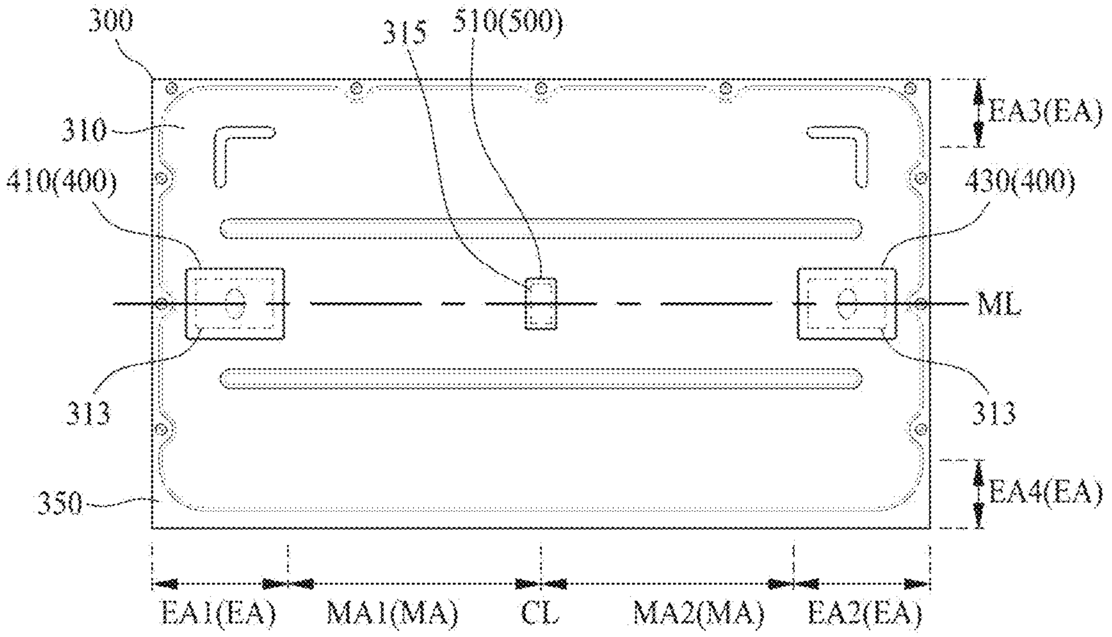
Figure 17E:
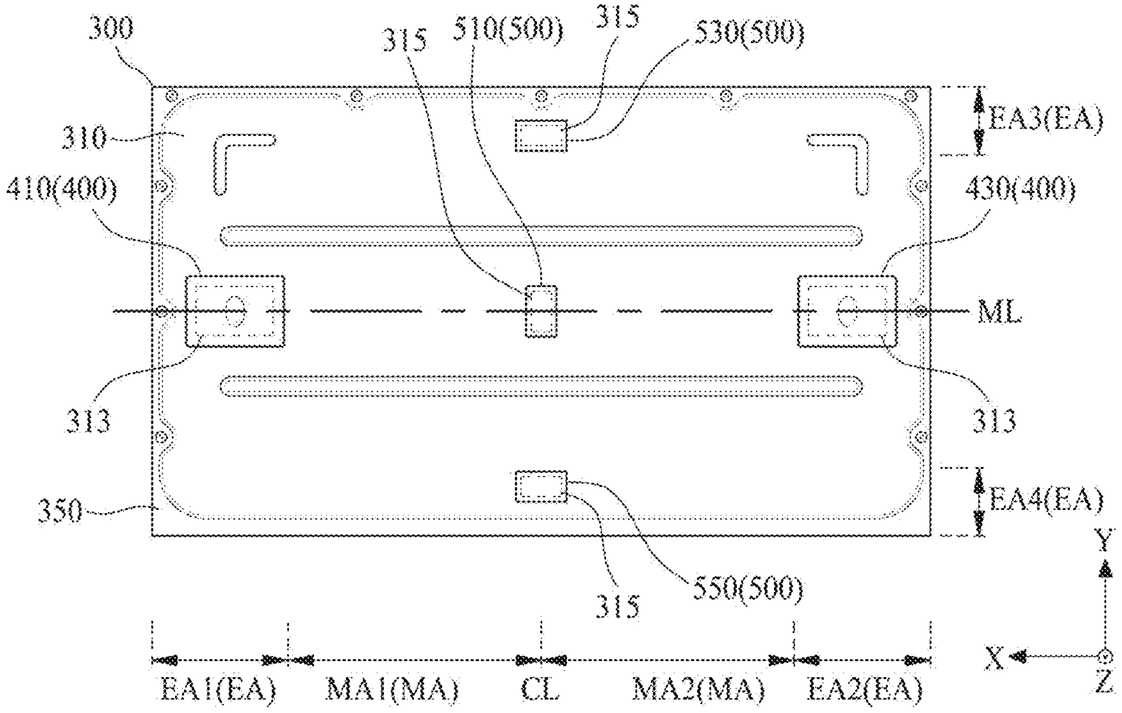

With reference to FIGS. 17D and 17E, in a display apparatus according to an embodiment of the present disclosure, a first vibration generating module 400 may include first and second sound generating units 410 and 430 respectively disposed in first and second periphery regions EA1 and EA2 of a rear cover part 310 with respect to a first direction X. The first and second sound generating units 410 and 430 may correspond to or overlap first and second periphery portions of a display module. In an example, the rear cover part 310 may include two first holes 313 that are respectively provided in the first and second periphery regions EA1 and EA2 to respectively overlap the first and second sound generating units 410 and 430. The first vibration generating module 400 may be substantially the same as the first vibration generating module 400 of the display apparatus illustrated in FIGS. 1 to 16, and thus, repetitive description may be omitted.

In the display apparatus according to an embodiment of the present disclosure, a second vibration generating module 500 may include at least one piezoelectric vibration unit 510, 530, and 550 disposed in at least one of a median center region (or a center region) and third and fourth periphery regions EA3 and EA4 of the rear cover part 310.

In an example, as illustrated in FIG. 17D, a second vibration generating module 500 may include one piezoelectric vibration unit 510 disposed in a median center region (or a center region) of a rear cover part 310. The one piezoelectric vibration unit 510 may correspond to or overlap a median center portion (or a center portion) of a display module. In an example, the rear cover part 310 may include one second hole 315 that is provided in a median center region (or a center region) to overlap the one piezoelectric vibration unit 510. Therefore, a display apparatus illustrated in FIG. 17D may have an effect similar to that of the display apparatus illustrated in FIGS. 1 to 16, and by using first and second sound generating units 410 and 430 and the one piezoelectric vibration unit 510, the display apparatus according to an embodiment may output a stereo sound based on sounds output from a left portion, a right portion, and a median center portion (or a center portion) of the display module, and may have a three-channel sound output characteristic. Also, comparing with the sound generating units 410 and 430, the number of piezoelectric vibration units 510 may be relatively reduced, and thus, the manufacturing cost may be reduced.

As another example, as illustrated in FIG. 17E, a second vibration generating module 500 may include first to third piezoelectric vibration units 510, 530, and 550 respectively disposed in a median center region (or a center region) and third and fourth periphery regions EA3 and EA4 of a rear cover part 310. The first to third piezoelectric vibration units 510, 530, and 550 may respectively correspond to or overlap a median center portion (or a center portion) and third and fourth periphery portions of a display module. In an example, the rear cover part 310 may include four second holes 315 that are respectively provided in the median center region (or a center region) and the third and fourth periphery regions EA3 and EA4 of a rear cover part 310 to respectively overlap the first to third piezoelectric vibration units 510, 530, and 550. Therefore, the display apparatus illustrated in FIG. 17E may have an effect similar to that of the display apparatus illustrated in FIGS. 1 to 16, and by using first and second sound generating units 410 and 430 and the first to third piezoelectric vibration units 510, 530, and 550, the display apparatus according to an embodiment may more increase a three-dimensional effect of a sound based on sounds output from a left portion, a right portion, an upper portion, a lower portion, and a median center portion (or a center portion) of the display module, and may have a five-channel sound output characteristic. The display apparatus according to an embodiment may be more suitable for a monitor of a personal gaming computer, but is not limited thereto.

As another example, in the display apparatus illustrated in FIG. 17E, the first piezoelectric vibration unit 510 in the median center region (or a center region) of the rear cover part 310 may be replaced by a sound generating device. The first piezoelectric vibration unit 510 may correspond to or overlap the median center portion (or a center portion) of the display module. In an example, a sound characteristic of the low-pitched sound band may be enhanced based on an amplification effect of a sound of the low-pitched sound band generated by a sound generating unit disposed in the median center region (or a center region) of the rear cover part 310.

Figure 17F:
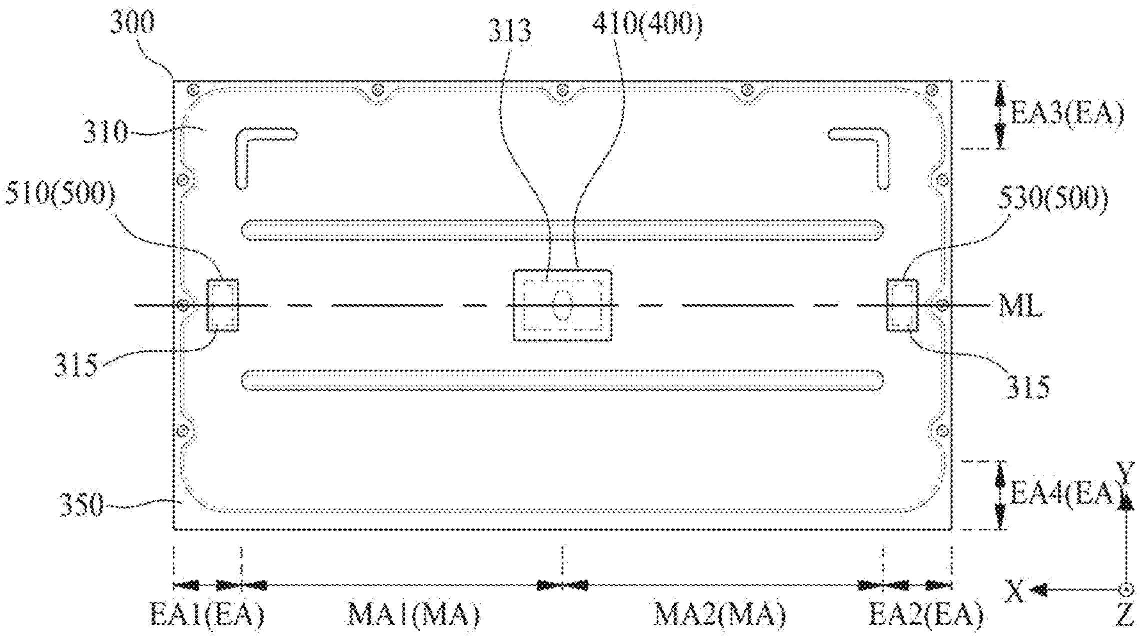
Figure 17G:
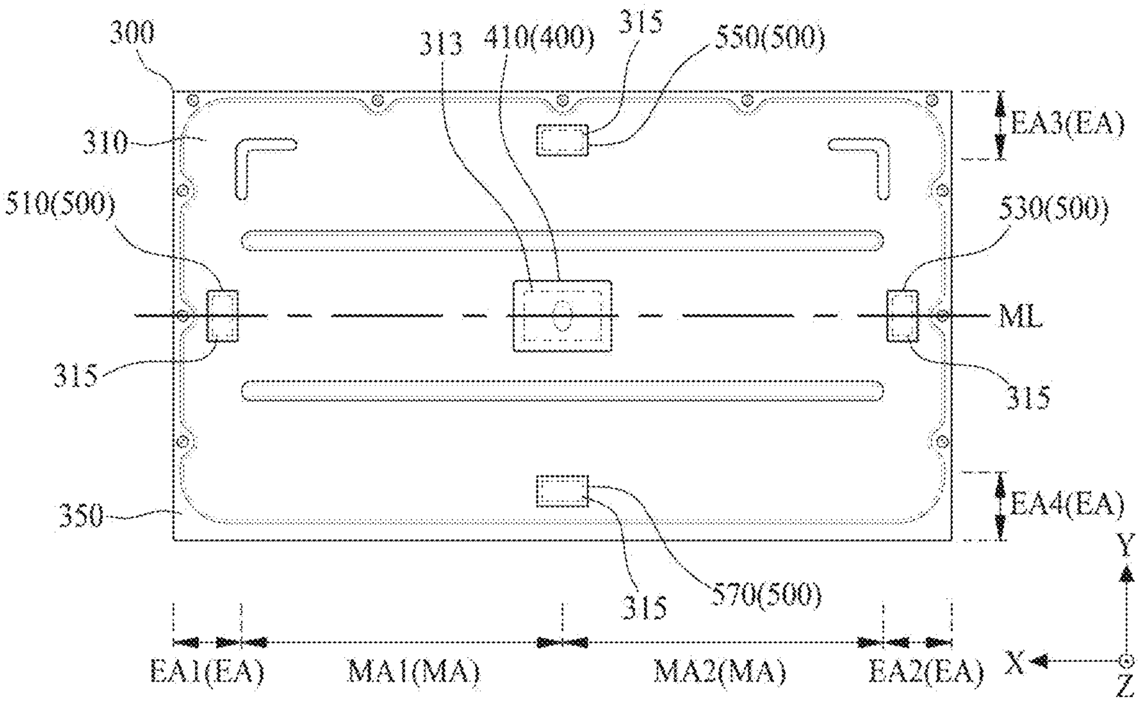

With reference to FIGS. 17F and 17G, in a display apparatus according to an embodiment of the present disclosure, a first vibration generating module 400 may include one sound generating unit 410 disposed in a median center region (or a center region) of a rear cover part 310. The one sound generating unit 410 may correspond to or overlap the median center portion (or a center portion) of a display module. In an example, the rear cover part 310 may include one first hole 313 that is provided in the median center region (or a center region) of the rear cover part 310 to overlap the one sound generating unit 410. The first vibration generating module 400 may be substantially the same as the first vibration generating module 400 of the display apparatus illustrated in FIGS. 1 to 16, and thus, repetitive description may be omitted.

In the display apparatus according to an embodiment of the present disclosure, a second vibration generating module 500 may include at least two piezoelectric vibration units 510, 530, 550, and 570 disposed in at least two of first to fourth periphery regions EA1 to EA4 of the rear cover part 310.

In an example, as illustrated in FIG. 17F, a second vibration generating module 500 may include first and second piezoelectric vibration units 510 and 530 respectively in center portions of first and second periphery regions EA1 and EA2 of a rear cover part 310. The first and second piezoelectric vibration units 510 and 530 may respectively correspond to or overlap first and second periphery portions of a display module. In an example, the rear cover part 310 may include two second holes 315 that are respectively provided in the first and second periphery regions EA1 and EA2 to respectively overlap the first and second piezoelectric vibration units 510 and 530. Therefore, the display apparatus illustrated in FIG. 17F may have the same effect as that of the display apparatus illustrated in FIGS. 1 to 16, and by using one sound generating unit 410 and the first and second piezoelectric vibration units 510 and 530, the display apparatus according to an embodiment may output a stereo sound based on sounds output from a left portion, a right portion, and a median center portion (or a center portion) of the display module, and may have a three-channel sound output characteristic. Moreover, a sound characteristic of the low-pitched sound band may be enhanced based on an amplification effect of a sound of the low-pitched sound band generated by the sound generating unit 410 disposed in the median center region (or a center region) of the rear cover part 310.

As another example, as illustrated in FIG. 17G, a second vibration generating module 500 may include first to fourth piezoelectric vibration units 510, 530, 550, and 570, respectively disposed in center portions of first to fourth periphery regions EAT to EA4 of a rear cover part 310. The first to fourth piezoelectric vibration units 510, 530, 550, and 570 may respectively correspond to or overlap the first to fourth periphery portions of a display module. In an example, the rear cover part 310 may include four second holes 315 that are respectively in the first to fourth periphery regions EAT to EA4 to respectively overlap the first to fourth piezoelectric vibration units 510, 530, 550, and 570. Therefore, the display apparatus illustrated in FIG. 17G may have the same effect as that of the display apparatus illustrated in FIGS. 1 to 16, and by using one sound generating unit 410 and the first to fourth piezoelectric vibration units 510, 530, 550, and 570, the display apparatus according to an embodiment may further increase a three-dimensional effect of a sound based on sounds output from a left portion, a right portion, an upper portion, a lower portion, and a median center portion (or a center portion) of the display module, and may have a three-channel sound output characteristic or may have a five-channel sound output characteristic. The display apparatus according to an embodiment may be more suitable for a monitor of a personal gaming computer, but is not limited thereto.

Figure 18:
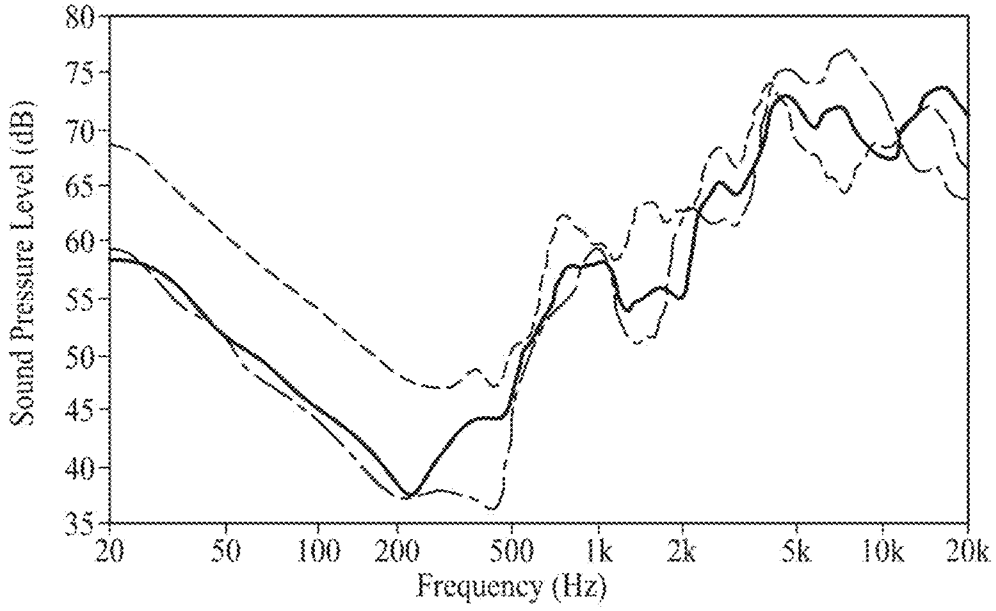
FIG. 18 is a graph showing a position-based frequency-sound pressure level characteristic of each of first and second vibration generating modules with respect to a first direction in a display apparatus according to an embodiment of the present disclosure.

FIG. 18 is a graph showing a position-based frequency-sound pressure level characteristic of each of first and second vibration generating modules with respect to a first direction in a display apparatus according to an embodiment of the present disclosure. In FIG. 18, a thick solid line represents a frequency-sound pressure level characteristic of a display apparatus of a first experimental example including a second vibration generating module disposed in a median center region (or a center region) of a rear cover part, a dotted line represents a frequency-sound pressure level characteristic of a display apparatus of a second experimental example including a second vibration generating module disposed in a periphery region of a rear cover part, and a one-dot dash line represents a frequency-sound pressure level characteristic of a display apparatus of a third experimental example including a second vibration generating module disposed in a center region between a median center region (or a center region) and a periphery region of a rear cover part. In FIG. 18, the abscissa axis represents a frequency (Hz), and the ordinate axis represents a sound pressure level (SPL) (dB).

As shown in FIG. 18, it may be shown that a sound output characteristic (the dotted line) of the display apparatus of the first experimental example has a relatively good sound pressure level characteristic in a frequency domain of 5 kHz or less and in a frequency domain of 10 kHz or more. Also, it may be shown that a sound output characteristic (the thick solid line) of the display apparatus of the second experimental example is almost similar to a sound output characteristic (the one-dot dash line) of the display apparatus of the third experimental example. Furthermore, it may be shown that the sound output characteristic of the display apparatus of each of the first to third experimental examples has a sound pressure level characteristic of 50 dB or more in a frequency domain of 500 Hz or more.

Therefore, considering a sound pressure level characteristic of the display apparatus according to the present disclosure in a frequency domain of 5 kHz or less, the second vibration generating module may be disposed in a median center region (or a center region) or a periphery region of the rear cover part as illustrated in FIGS. 2, 14, and 17A to 17G.

Figure 19:
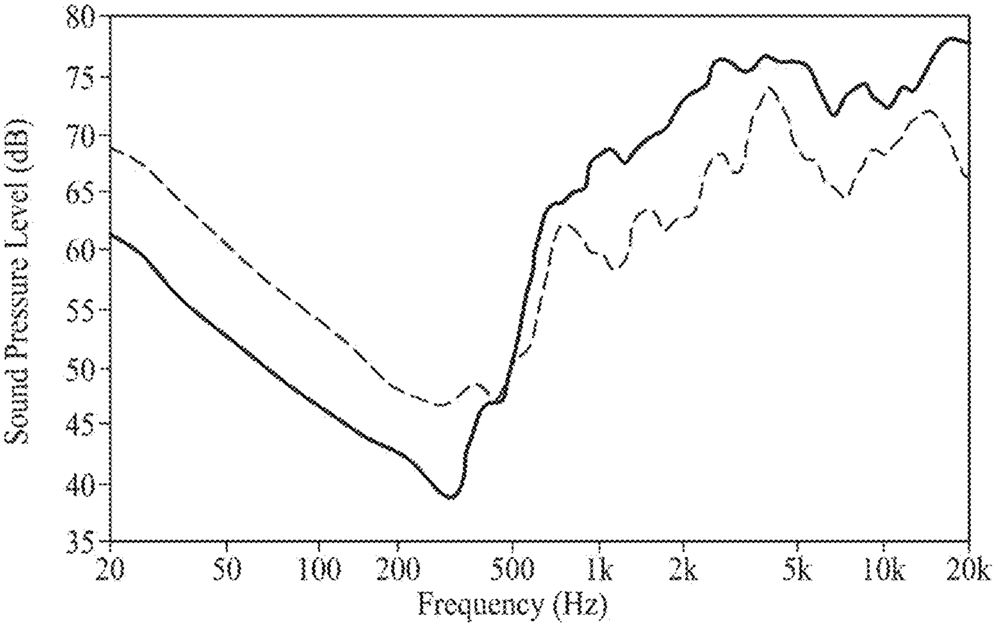
FIG. 19 is a graph showing a frequency-sound pressure level characteristic of a second vibration generating module according to first and second embodiments in a display apparatus according to an embodiment of the present disclosure.

FIG. 19 is a graph showing a frequency-sound pressure level characteristic of a second vibration generating module according to first and second embodiments in a display apparatus according to an embodiment of the present disclosure. In FIG. 19, a dotted line represents a frequency-sound pressure level characteristic of a display apparatus including a second vibration generating module according to the first embodiment illustrated in FIG. 4, and a thick solid line represents a frequency-sound pressure level characteristic of a display apparatus including a second vibration generating module including a base plate according to the second embodiment as illustrated in FIG. 13. In FIG. 19, the abscissa axis represents a frequency (Hz), and the ordinate axis represents a sound pressure level (SPL) (dB).

As shown in FIG. 19, comparing with a sound output characteristic (the thick solid line) of the display apparatus including the second vibration generating module according to the second embodiment, it may be shown that a sound output characteristic (the dotted line) of the display apparatus including the second vibration generating module according to the first embodiment has a relatively high-pitched sound pressure level characteristic in a frequency domain of 500 Hz or less. Also, comparing with the sound output characteristic (the dotted line) of the display apparatus including the second vibration generating module according to the first embodiment, it may be shown that the sound output characteristic (the thick solid line) of the display apparatus including the second vibration generating module according to the second embodiment has a relatively high-pitched sound pressure level characteristic in a frequency domain of 500 Hz or more.

Therefore, the second vibration generating module according to the first embodiment may be applied to a display apparatus requiring a relatively high-pitched sound pressure level characteristic in a frequency domain of 500 Hz or less. Also, the second vibration generating module according to the second embodiment may be applied to a display apparatus requiring a relatively high-pitched sound pressure level characteristic in a frequency domain of 500 Hz or more.

The display apparatus according to an embodiment of the present disclosure may be applied to various applications that output sound based on a vibration of a display module without a separate speaker. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, TVs, wallpaper display apparatuses, signage apparatuses, game machines, notebook computers, monitors, cameras, camcorders, home appliances, etc. Also, the flexible vibration module according to an embodiment of the present disclosure may be applied to organic light-emitting lighting devices or inorganic light-emitting lighting devices. Furthermore, when the flexible vibration module according to the present disclosure is applied to a mobile apparatus, the flexible vibration module may act as a speaker or a receiver.

A display apparatus according to an embodiment of the present disclosure will be described below.

A display apparatus according to the present disclosure may include a display module including a display panel and configured to display an image; a rear cover on a rear surface of the display module; a first vibration generating module in a first rear region of the rear cover; and a second vibration generating module in a second rear region of the rear cover, wherein the rear cover includes a first hole that overlaps the first vibration generating module, and a second hole that overlaps the second vibration generating module.

According to some embodiments of the present disclosure, the first rear region of the rear cover may overlap a center portion or a periphery portion of the display module; and the second rear region of the rear cover may overlap a portion, except the first rear region, of the center portion and the periphery portion of the display module.

According to some embodiments of the present disclosure, the display apparatus may be configured to output a first sound of a first sound band based on a vibration of the first vibration generating module and a second sound of a second sound band based on a vibration of the second vibration generating module, and the first sound band may differ from the second sound band.

According to some embodiments of the present disclosure, the rear cover may further include a rear cover part on the rear surface of the display module, the rear cover part being configured to support the first vibration generating module and the second vibration generating module; and the rear cover part may include the first hole in the first rear region; and the second hole in the second rear region.

According to some embodiments of the present disclosure, the first vibration generating module may be configured to vibrate without vibrating the rear cover part, and the second vibration generating module may be configured to vibrate without vibrating the rear cover part.

According to some embodiments of the present disclosure, the first rear region of the rear cover may overlap a center portion of the display module; the second rear region of the rear cover may overlap a periphery portion of the display module; the rear cover may further include a rear cover part on the rear surface of the display module, the rear cover part being configured to support the first vibration generating module and the second vibration generating module; and the rear cover part may include a hole portion in a rear region between the first vibration generating module and the second vibration generating module.

According to some embodiments of the present disclosure, the rear cover part, the hole portion, and the first vibration generating module may configure a Helmholtz resonator.

According to some embodiments of the present disclosure, the display apparatus may further include a system rear cover on a rear surface of the rear cover, wherein: the first rear region of the rear cover may overlap a center portion of the display module, and the second rear region of the rear cover may overlap a periphery portion of the display module; and the system rear cover may include a system rear cover box configured to seal a peripheral space of the first vibration generating module.

According to some embodiments of the present disclosure, the system rear cover may further include a rear structure on the rear surface of the rear cover; a side structure connected to a periphery of the rear structure and configured to cover a side surface of the display module; and a system rear cover duct in at least a portion of the side structure.

According to some embodiments of the present disclosure, the rear cover may further include a rear cover part on the rear surface of the display module, the rear cover part being configured to support the first vibration generating module and the second vibration generating module; the rear cover part may include a hole portion in a rear region between the first vibration generating module and the second vibration generating module; and the system rear cover box may be configured to accommodate the first vibration generating module and the hole portion.

According to some embodiments of the present disclosure, a display apparatus may further include a panel guide configured to support a periphery portion of a rear surface of the display panel, the panel guide being supported by the rear cover, wherein: the display module further includes a backlight unit supported by the rear cover and on the rear surface of the display panel, and the backlight unit may include a reflective sheet on the rear cover to cover the first hole and the second hole, a light guide plate on the reflective sheet, and an optical sheet part on the light guide plate.

According to some embodiments of the present disclosure, the rear cover may further include a rear cover part on the rear surface of the display module, the rear cover part being configured to support the first vibration generating module and the second vibration generating module; and the rear cover part may include a structure having a concavely curved shape in a cross-sectional view.

According to some embodiments of the present disclosure, a display apparatus may further include a panel guide configured to support a periphery portion of a rear surface of the display panel, the panel guide being supported by the rear cover, wherein the display module may further include a backlight unit between the display panel and the rear cover part, and the backlight unit may include a reflective sheet on the rear cover part to cover the first hole and the second hole, a light guide plate on the reflective sheet, an optical sheet part on the light guide plate, and an air gap between the reflective sheet and the light guide plate.

According to some embodiments of the present disclosure, the reflective sheet may be on the rear cover part to have a conformal shape which is based on a shape of the rear cover part, and the light guide plate may be on the reflective sheet to have a non-conformal shape which is not based on the shape of the rear cover part.

According to some embodiments of the present disclosure, the first vibration generating module may include a sound generating unit having a bobbin and a coil wound around the bobbin; and the bobbin of the sound generating unit may be coupled to the rear cover near the first hole.

According to some embodiments of the present disclosure, the first vibration generating module may include a sound generating unit having a bobbin and a coil wound around the bobbin; and the bobbin of the sound generating unit may have a size that enables the bobbin to be accommodated into the first hole.

According to some embodiments of the present disclosure, the first vibration generating module may be coupled to the rear cover by a connection member; and the connection member may have a thickness that is one to four times a thickness of the rear cover.

According to some embodiments of the present disclosure, the second vibration generating module may include a piezoelectric vibration unit having a piezoelectric element.

According to some embodiments of the present disclosure, the second vibration generating module may include a piezoelectric vibration unit having a piezoelectric element; the piezoelectric vibration unit may further include a base plate coupled to the rear cover to cover the second hole; and the piezoelectric element may be in the base plate.

According to some embodiments of the present disclosure, the piezoelectric vibration unit may further include a cover plate coupled to the piezoelectric element; and each of the piezoelectric element and the cover plate may have a size that is less than a size of the second hole.

A display apparatus according to the present disclosure may include a display module including a display panel and configured to display an image; a rear cover including a rear cover part that covers a rear surface of the display module; and a first vibration generating module and a second vibration generating module both in the rear cover part and configured to vibrate the display module; wherein the rear cover part includes a first gap between the first vibration generating module and the display module; and a second gap between the second vibration generating module and the display module.

According to some embodiments of the present disclosure, the rear cover part may further include a first hole configured to provide the first gap between the first vibration generating module and the display module; and a second hole configured to provide the second gap between the second vibration generating module and the display module.

According to some embodiments of the present disclosure, the display module may further include a backlight unit between the display panel and the rear cover part; the rear cover part may further include a structure having a concavely curved shape in a cross-sectional view; and the backlight unit may include a reflective sheet in the rear cover part to cover the first gap and the second gap; a light guide plate on the reflective sheet; an optical sheet part on the light guide plate; and an air gap between the reflective sheet and the light guide plate.

According to some embodiments of the present disclosure, the first vibration generating module may include a sound generating unit having a bobbin and a coil wound around the bobbin; and the bobbin of the sound generating unit may be coupled to the rear cover near the first hole.

According to some embodiments of the present disclosure, the first vibration generating module may include a sound generating unit having a bobbin and a coil wound around the bobbin; and the bobbin of the sound generating unit may have a size that enables the bobbin to be accommodated into the first hole.

According to some embodiments of the present disclosure, the first vibration generating module may be coupled to the rear cover by a connection member; and the connection member may have a thickness that is one to four times a thickness of the rear cover.

According to some embodiments of the present disclosure, the second vibration generating module may include a piezoelectric vibration unit having a piezoelectric element.

According to some embodiments of the present disclosure, the second vibration generating module may include a piezoelectric vibration unit having a piezoelectric element; the piezoelectric vibration unit may further include a base plate coupled to the rear cover to cover the second hole; and the piezoelectric element may be in the base plate.

According to some embodiments of the present disclosure, the piezoelectric vibration unit may further include a cover plate coupled to the piezoelectric element; and each of the piezoelectric element and the cover plate may have a size that is less than a size of the second hole.

According to some embodiments of the present disclosure, the first vibration generating module may overlap one of a center portion and a periphery portion of the display module; and the second vibration generating module may overlap the other of the center portion and the periphery portion of the display module.

According to some embodiments of the present disclosure, the display module may further include first and second periphery portions parallel to each other; and third and fourth periphery portions parallel to each other; the second vibration generating module may include a first piezoelectric vibration unit that overlaps the first periphery portion of the display module; and a second piezoelectric vibration unit that overlaps the second periphery portion of the display module; and the first vibration generating module may include first and second sound generating units respectively adjacent to the first and second piezoelectric vibration units.

According to some embodiments of the present disclosure, the second vibration generating module may further comprise at least one of a third piezoelectric vibration unit that overlaps the third periphery portion of the display module; a fourth piezoelectric vibration unit that overlaps the fourth periphery portion of the display module; and a fifth piezoelectric vibration unit that overlaps a center portion of the display module.

According to some embodiments of the present disclosure, the display module may further include first and second periphery portions parallel to each other; and third and fourth periphery portions parallel to each other; the first vibration generating module may include a first sound generating unit that overlaps the first periphery portion of the display module; and a second sound generating unit that overlaps the second periphery portion of the display module; and the second vibration generating module may further include at least one of a first piezoelectric vibration unit that overlaps a center portion of the display module; a second piezoelectric vibration unit that overlaps the third periphery portion of the display module; and a third piezoelectric vibration unit that overlaps the fourth periphery portion of the display module.

According to some embodiments of the present disclosure, the display module may further include first and second periphery portions parallel to each other; and third and fourth periphery portions parallel to each other; the first vibration generating module may include a sound generating unit that overlaps a center portion of the display module; and the second vibration generating module may include a first piezoelectric vibration unit that overlaps the first periphery portion of the display module; and a second piezoelectric vibration unit that overlaps the second periphery portion of the display module.

According to some embodiments of the present disclosure, the second vibration generating module may further include at least one of a third piezoelectric vibration unit that overlaps the third periphery portion of the display module; and a fourth piezoelectric vibration unit that overlaps the fourth periphery portion of the display module.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A display apparatus, comprising:

a display module including a display panel and configured to display an image;

a rear cover at a rear surface of the display module;

a first vibration generating device at a first rear region of the rear cover and configured to generate a first sound wave; and a second vibration generating device at a second rear region of the rear cover and configured to generate a second sound wave different from the first sound wave, wherein the display module is configured to vibrate by one or more of the first and second sound waves transmitted from one or more of the first and second vibration generating devices to output sound, wherein the first rear region of the rear cover overlaps a center portion or a periphery portion of the display module, and wherein the second rear region of the rear cover overlaps a portion, except the first rear region, of the center portion and the periphery portion of the display module.

2. The display apparatus of claim 1, wherein the display module is further configured to output one or more of a first sound based on the first sound wave and a second sound based on the second sound wave.

3. The display apparatus of claim 2, wherein a sound band of the first sound differs from a sound band of the second sound.

4. The display apparatus of claim 2, wherein:

the first sound includes a frequency of a low-pitched sound band; and/or the second sound includes a frequency of a middle-high-pitched sound band or a high-pitched sound band.

5. The display apparatus of claim 1, wherein the display module further includes:

a first area vibrating by the first sound wave transmitted from the first vibration generating device; and a second area vibrating by the second sound wave transmitted from the second vibration generating device.

6. The display apparatus of claim 1, wherein the rear cover includes a rear cover part at the rear surface of the display module including the first rear region and the second rear region, the rear cover part being configured to support the first vibration generating device and the second vibration generating device.

7. The display apparatus of claim 6, wherein the rear cover part includes:

a first hole that overlaps the first vibration generating device; and a second hole that overlaps the second vibration generating device.

8. The display apparatus of claim 7, wherein:

the first hole is between the first vibration generating device and the display module; and the second hole is between the second vibration generating device and the display module.

9. The display apparatus of claim 7, wherein:

a size of the first hole is smaller than a size of the first vibration generating device, and a size of the second hole is smaller than a size of the second vibration generating device.

10. The display apparatus of claim 7, wherein:

the first vibration generating device is configured to cover the first hole; and the second vibration generating device is configured to cover the second hole.

11. The display apparatus of claim 7, wherein:

the first vibration generating device is configured to be coupled to the rear cover part to cover the first hole, the first vibration generating device being further configured to include a bobbin and a coil wound around the bobbin; and the bobbin is configured to be accommodated into the first hole.

12. The display apparatus of claim 7, wherein:

the first vibration generating device is configured to be coupled to the rear cover part to cover the first hole, the first vibration generating device being further configured to include a bobbin and a coil wound around the bobbin; and the bobbin is configured to be coupled to the rear cover part near the first hole.

13. The display apparatus of claim 1, wherein the display module further includes:

first and second periphery portions parallel to each other; and third and fourth periphery portions parallel to each other, wherein the second vibration generating device includes:

a first piezoelectric vibration device that overlaps the first periphery portion of the display module; and a second piezoelectric vibration device that overlaps the second periphery portion of the display module, and wherein the first vibration generating device includes first and second sound generating device respectively adjacent to the first and second piezoelectric vibration devices.

14. The display apparatus of claim 13, wherein the second vibration generating device further comprises at least one of:

a third piezoelectric vibration device that overlaps the third periphery portion of the display module;

a fourth piezoelectric vibration device that overlaps the fourth periphery portion of the display module; and a fifth piezoelectric vibration device that overlaps a center portion of the display module.

15. The display apparatus of claim 1, wherein the display module further includes:

first and second periphery portions parallel to each other; and third and fourth periphery portions parallel to each other, wherein the first vibration generating device includes:

a first sound generating device that overlaps the first periphery portion of the display module; and a second sound generating device that overlaps the second periphery portion of the display module, and wherein the second vibration generating device further includes at least one of:

a first piezoelectric vibration device that overlaps a center portion of the display module;

a second piezoelectric vibration device that overlaps the third periphery portion of the display module; and a third piezoelectric vibration device that overlaps the fourth periphery portion of the display module.

16. The display apparatus of claim 1, wherein the display module further includes:

first and second periphery portions parallel to each other; and third and fourth periphery portions parallel to each other, wherein the first vibration generating device includes a sound generating device that overlaps a center portion of the display module, and wherein the second vibration generating device includes:

a first piezoelectric vibration device that overlaps the first periphery portion of the display module; and a second piezoelectric vibration part device overlaps the second periphery portion of the display module.

17. The display apparatus of claim 16, wherein the second vibration generating device further comprises at least one of:

a third piezoelectric vibration device that overlaps the third periphery portion of the display module; and a fourth piezoelectric vibration device that overlaps the fourth periphery portion of the display module.

18. The display apparatus of claim 1, wherein the rear cover includes a hole portion at a rear region between the first vibration generating device and the second vibration generating device.

19. The display apparatus of claim 1, wherein the display module further comprises a backlight part between the display panel and the rear cover, wherein the backlight part is configured to vibrate by one or more of a vibration of the first vibration generating device and a vibration of the second vibration generating device, and wherein the display panel is configured to vibrate by a vibration of the backlight part to output the sound.

20. The display apparatus of claim 19, wherein the display module further comprises a panel vibration space between the display panel and the backlight part.

21. The display apparatus of claim 19, wherein the backlight part includes:

a reflective sheet on the rear cover to receive one or more of the vibration of the first vibration generating device and the vibration of the second vibration generating device;

a light guide plate on the reflective sheet;

an optical sheet part on the light guide plate; and an air gap between the reflective sheet and the light guide plate.

22. The display apparatus of claim 1, wherein the display panel is configured to act as a vibration plate to output the sound.

23. A display apparatus, comprising:

a display module including a display panel and configured to display an image;

a rear cover at a rear surface of the display module and including a first rear region and a second rear region;

a first vibration generating device configured to vibrate the rear cover; and a second vibration generating device configured to vibrate the display module, wherein the display module is further configured to vibrate by one or more of a vibration of the first vibration generating device and a vibration of the second vibration generating device to output sound, wherein the first rear region of the rear cover overlaps a center portion or a periphery portion of the display module, and wherein the second rear region of the rear cover overlaps a portion, except the first rear region, of the center portion and the periphery portion of the display module.

24. The display apparatus of claim 23, wherein the rear cover includes:

a rear cover part at the rear surface of the display module;

a first hole at the rear cover part to overlap the first vibration generating device; and a second hole at the rear cover part to overlap the second vibration generating device.

25. The display apparatus of claim 24, wherein:

the first vibration generating device is further configured to vibrate the rear cover part near the first hole to generate a first sound wave in the first hole; and the second vibration generating device is further configured to generate a second sound wave in the second hole to vibrate the display module.

26. The display apparatus of claim 24, wherein the second vibration generating device includes a piezoelectric vibration device at a rear surface of the rear cover part to cover the second hole.

27. The display apparatus of claim 24, wherein the second vibration generating device includes:

a base plate coupled to the rear cover part to cover the second hole; and a piezoelectric vibration device at the base plate to overlap the second hole.

28. The display apparatus of claim 26, wherein the piezoelectric vibration device has a size smaller than a size of the second hole.

29. The display apparatus of claim 24, wherein:

the first vibration generating device is configured to be coupled to the rear cover part to cover the first hole, the first vibration generating device being further configured to include a bobbin and a coil wound around the bobbin; and the bobbin is configured to be coupled to the rear cover part near the first hole.

30. The display apparatus of claim 23, wherein the display module further includes:

first and second periphery portions parallel to each other; and third and fourth periphery portions parallel to each other, wherein the second vibration generating device includes:

a first piezoelectric vibration device that overlaps the first periphery portion of the display module; and a second piezoelectric vibration device that overlaps the second periphery portion of the display module, and wherein the first vibration generating device includes first and second sound generating device respectively adjacent to the first and second piezoelectric vibration devices.

31. The display apparatus of claim 30, wherein the second vibration generating device further comprises at least one of:

a third piezoelectric vibration device that overlaps the third periphery portion of the display module;

a fourth piezoelectric vibration device that overlaps the fourth periphery portion of the display module; and a fifth piezoelectric vibration device that overlaps a center portion of the display module.

32. The display apparatus of claim 23, wherein the display module further includes:

first and second periphery portions parallel to each other; and third and fourth periphery portions parallel to each other, wherein the first vibration generating device includes:

a first sound generating device that overlaps the first periphery portion of the display module; and a second sound generating device that overlaps the second periphery portion of the display module, and wherein the second vibration generating device further includes at least one of:

a first piezoelectric vibration device that overlaps a center portion of the display module;

a second piezoelectric vibration device that overlaps the third periphery portion of the display module; and a third piezoelectric vibration device that overlaps the fourth periphery portion of the display module.

33. The display apparatus of claim 23, wherein the display module further includes:

first and second periphery portions parallel to each other; and third and fourth periphery portions parallel to each other, wherein the first vibration generating device includes a sound generating device that overlaps a center portion of the display module, and wherein the second vibration generating device includes:

a first piezoelectric vibration device that overlaps the first periphery portion of the display module; and a second piezoelectric vibration part device overlaps the second periphery portion of the display module.

34. The display apparatus of claim 33, wherein the second vibration generating device further comprises at least one of:

a third piezoelectric vibration device that overlaps the third periphery portion of the display module; and a fourth piezoelectric vibration device that overlaps the fourth periphery portion of the display module.

35. The display apparatus of claim 23, wherein the rear cover includes a hole portion at a rear region between the first vibration generating device and the second vibration generating device.

36. The display apparatus of claim 23, wherein the display module further comprises a backlight part between the display panel and the rear cover, wherein the backlight part is configured to vibrate by one or more of a vibration of the first vibration generating device and a vibration of the second vibration generating device, and wherein the display panel is configured to vibrate by a vibration of the backlight part to output the sound.

37. The display apparatus of claim 36, wherein the display module further comprises a panel vibration space between the display panel and the backlight part.

38. The display apparatus of claim 37, wherein the backlight part includes:

a reflective sheet on the rear cover to receive one or more of the vibration of the first vibration generating device and the vibration of the second vibration generating device;

a light guide plate on the reflective sheet;

an optical sheet part on the light guide plate; and an air gap between the reflective sheet and the light guide plate.

39. The display apparatus of claim 23, wherein the display panel is configured to act as a vibration plate to output the sound.

* * * * *